United States Patent
Wu

(10) Patent No.: US 10,785,731 B2
(45) Date of Patent: Sep. 22, 2020

(54) TRANSMIT POWER DETERMINING METHOD AND WIRELESS COMMUNICATIONS DEVICE

(71) Applicant: HUAWEI TECHNOLOGIES CO., LTD., Shenzhen (CN)

(72) Inventor: Qian Wu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/512,418

(22) Filed: Jul. 16, 2019

(65) Prior Publication Data
US 2019/0342841 A1 Nov. 7, 2019

Related U.S. Application Data

(63) Continuation of application No. PCT/CN2017/071281, filed on Jan. 16, 2017.

(51) Int. Cl.
*H04W 52/24* (2009.01)
*H04W 72/04* (2009.01)
(Continued)

(52) U.S. Cl.
CPC ......... *H04W 52/243* (2013.01); *H04W 40/08* (2013.01); *H04W 52/246* (2013.01);
(Continued)

(58) Field of Classification Search
CPC ... H04W 40/08; H04W 52/30; H04W 52/243; H04W 52/246; H04W 64/00;
(Continued)

(56) References Cited

U.S. PATENT DOCUMENTS 7,317,900 B1 * 1/2008 Linde .................. H04B 1/40
370/331
2009/0010186 A1 * 1/2009 Li .................... H04W 52/383
370/310
(Continued)

FOREIGN PATENT DOCUMENTS

| CN | 101400118 A | 4/2009 |
| CN | 103037493 A | 4/2013 |
| CN | 104284408 A | 1/2015 |

OTHER PUBLICATIONS

Qualcomm Incorporated: "Discussion on Coexistence with GEN DSRC Requirements in Region 1", 3GPP Draft; R4-167947, vol. RAN WG4, no. Ljubljana, Slovenia; Oct. 1, 2016 O-Oct. 14, 2016 Oct. 9, 2016, XP051152925, total 3 pages.
(Continued)

*Primary Examiner* — Dominic E Rego
(74) *Attorney, Agent, or Firm* — Kilpatrick Townsend & Stockton LLP

(57) ABSTRACT

Embodiments provide a transmit power determining method. Under this method, a first wireless communications device determines its distance to a second wireless communications device a working frequency of the second wireless communications device, and a first condition is met. If the first wireless communications device determines that its maximum transmit power is greater than a preset threshold, it adjusts the maximum transmit power, so that the adjusted maximum transmit power is equal to or less than the preset threshold. The preset threshold is used to suppress interference caused by the first wireless communications device to receiving performance of the second wireless communications device under the first condition. The first condition includes the distance to the second wireless communications device being less than or equal to a first threshold, and a working frequency difference between the first and second
(Continued)

A first wireless communications device determines a distance between the first wireless communications device and a second wireless communications device — 101

The first wireless communications device determines a working frequency of the second wireless communications device — 102

The first wireless communications device adjusts a maximum transmit power corresponding to the first wireless communications device — 103 wireless communications devices being less than or equal to a second threshold.

20 Claims, 2 Drawing Sheets

(51) Int. Cl.
| | |
|---|---|
| *H04W 52/30* | (2009.01) |
| *H04W 40/08* | (2009.01) |
| *H04W 52/36* | (2009.01) |
| *H04W 52/38* | (2009.01) |
| *H04W 64/00* | (2009.01) |
| *H04W 52/28* | (2009.01) |

(52) U.S. Cl.
CPC ......... *H04W 52/283* (2013.01); *H04W 52/30* (2013.01); *H04W 52/367* (2013.01); *H04W 64/00* (2013.01); *H04W 72/0473* (2013.01); *H04W 52/383* (2013.01)

(58) Field of Classification Search
CPC ............. H04W 72/0473; H04W 40/00; H04W 52/367; H04W 52/283; H04W 52/383
See application file for complete search history.

(56) References Cited

U.S. PATENT DOCUMENTS

| | | | |
|---|---|---|---|
| 2009/0243932 A1* | 10/2009 | Moshfeghi | G01S 13/38 342/378 |
| 2011/0264035 A1* | 10/2011 | Yodfat | H04W 52/22 604/66 |
| 2012/0021692 A1 | 1/2012 | Lee | |
| 2012/0044815 A1* | 2/2012 | Geirhofer | H04W 52/243 370/248 |
| 2013/0095756 A1* | 4/2013 | Hamilton | H04W 4/80 455/41.1 |
| 2013/0181861 A1* | 7/2013 | Zohar | G01S 3/48 342/118 |
| 2014/0141789 A1* | 5/2014 | Tarokh | H04W 52/04 455/450 |
| 2014/0241263 A1* | 8/2014 | Tu | H04W 16/14 370/329 |
| 2014/0281534 A1* | 9/2014 | McCormack | H04B 5/02 713/168 |
| 2014/0293814 A1* | 10/2014 | Sachse | G01S 13/84 370/252 |
| 2015/0049736 A1* | 2/2015 | Liu | H04W 72/04 370/331 |
| 2015/0296553 A1* | 10/2015 | DiFranco | H04W 76/14 455/41.2 |
| 2016/0033617 A1* | 2/2016 | Hahn | G01S 5/0215 370/252 |
| 2016/0037522 A1* | 2/2016 | Georgeaux | H04W 72/0453 370/329 |
| 2016/0037530 A1* | 2/2016 | Peng | H04B 17/382 370/329 |
| 2016/0105639 A1* | 4/2016 | Chiang | H04W 4/023 348/14.02 |
| 2016/0286500 A1* | 9/2016 | Zur | H04L 67/104 |
| 2016/0337809 A1* | 11/2016 | Narasimha | H04W 4/023 |
| 2016/0359526 A1* | 12/2016 | Pellew | G01S 11/06 |
| 2017/0094655 A1* | 3/2017 | Dai | H04L 5/14 |
| 2017/0188220 A1* | 6/2017 | Marsch | H04W 8/005 |
| 2017/0367059 A1* | 12/2017 | Park | H04L 5/0048 |
| 2018/0095818 A1* | 4/2018 | Arjun | G06F 11/0757 |
| 2018/0110053 A1* | 4/2018 | Wei | H04W 72/0473 |

OTHER PUBLICATIONS

"Intelligent Transport Systems (ITS); Mitigation techniques to avoid interference between European GEN Dedicated Short Range Communication (GEN DSRC) equipment and Intelligent Transport Systems(ITS) operating in the 5 GHz frequency range; Draft ETSI TS 102 792", ETSI Draft; Draft ETSI TS 102 792, vol. ITS, No. V1.1.15, Jun. 12, 2015, pp. 1-23, XP014242544.

3GPP TS 36.101 V14.2.1 (Jan. 2017);3rd Generation Partnership Project;Technical Specification Group Radio Access Network;Evolved Universal Terrestrial Radio Access (E-UTRA);User Equipment (UE) radio transmission and reception (Release 14);total 1200 pages.

Qualcomm Incorporated,"On Handling CEN DSRC Protection Requirements in Region 1",3GPP TSG-RAN WG4 Meeting #81 R4-1609927,Reno, Nevada, USA, Nov. 14-18, 2016,total 3 pages.

Qualcomm,"CR for V2V UE RF requirements to support CEN DSRC protection techniques",3GPP TSG-RAN WG4 Meeting #81 R4-1609967,Reno, Nevada, USA, Nov. 14-18, 2016,Change Request 36.101 CR rev—Current version: 14.1.0,total 7 pages.

ETSI TS 102 792 V1.2.1 (Jun. 2015),Intelligent Transport Systems (ITS);Mitigation techniques to avoid interference between European CEN Dedicated Short Range Communication (CEN DSRC) equipment and Intelligent Transport Systems (ITS) operating in the 5 GHz frequency range,total 23 pages.

\* cited by examiner

TRANSMIT POWER DETERMINING METHOD AND WIRELESS COMMUNICATIONS DEVICE

CROSS-REFERENCE TO RELATED APPLICATIONS

This application is a continuation of International Application No. PCT/CN2017/071281, filed on Jan. 16, 2017, the disclosure of which is hereby incorporated by reference in its entirety.

TECHNICAL FIELD

This application relates to the communications field, and in particular, to a transmit power determining method and a wireless communications device.

BACKGROUND

In Europe, a frequency range used by an automatic tolling station (tolling station) is very close to a frequency range used by an intelligent traffic system (Intelligent traffic system, ITS). To protect the tolling station from being interfered with by an ITS terminal, in the European Telecommunications Standards Institute (European Telecommunications Standards Institute, ETSI) technical specification (Technical Specification, TS) 102 792, a requirement of coexistence of the ITS technology and an existing tolling station is defined, as shown in FIG. 1. When the ITS terminal (a working frequency range is 5855 MHz to 5925 MHz) is near the tolling station (a working frequency range is 5795 MHz to 5815 MHz), a power of the ITS terminal needs to be less than or equal to a particular value, to not interfere with the tolling station. The power requirement generated due to coexistence needs to be reflected on a definition of a power of vehicle-to-vehicle (Vehicle-to-Vehicle, V2V) user equipment (User equipment, UE) in 3GPP, so that the V2V UE can meet the coexistence requirement stipulated in the ETSI specification.

In the prior art, a dynamic maximum power reduction (dynamic maximum power reduction, D-MPR) is introduced to a maximum configured transmit power, and a calculation formula of the maximum configured transmit power in 3GPP TS 36.101 is modified as:

$$P_{CMAX\_L,c} \leq P_{CMAX,c} \leq P_{CMAX\_H,c};$$

$$P_{CMAX\_L,c} = \text{MIN}\left\{P_{EMAX,c} - \Delta T_{C,c},\right.$$
$$\left. P_{PowerClass} - \text{MAX}\left(\begin{array}{c}MPR_c + \text{MAX}(A - MPR_c, D - MPR) + \\ \Delta T_{IB,c} + \Delta T_{C,c} + \Delta T_{ProSe}, P - MPR_c\end{array}\right)\right\};$$

and $$P_{CMAX\_H,c} = \text{MIN}\{P_{EMAX,c}, P_{PowerClass}\}.$$

However, in the foregoing manner, only a lower limit of the maximum configured transmit power is modified, but an upper limit is not modified, and the upper limit is still greater than that in a general status stipulated in the coexistence requirement. As a result, the foregoing manner cannot meet the coexistence requirement stipulated in the ETSI specification, and relatively high interference is generated between devices.

SUMMARY

Embodiments of the present invention provide a transmit power determining method and a wireless communications device, to suppress interference between devices, and meet a coexistence requirement of a plurality of devices.

In view of this, according to a first aspect, an embodiment of the present invention provides a transmit power determining method. The method may include:

determining, by a first wireless communications device, a distance between the first wireless communications device and a second wireless communications device, and a working frequency of the second wireless communications device; and when the first wireless communications device determines that a first condition is met, if the first wireless communications device determines that a maximum transmit power corresponding to the first wireless communications device is greater than a preset threshold, adjusting the maximum transmit power to the preset threshold, where the preset threshold is used to suppress interference caused by the first wireless communications device to receiving performance of the second wireless communications device under the first condition, and the first condition includes that the distance between the first wireless communications device and the second wireless communications device is less than or equal to a first threshold, and a difference between a working frequency of the first wireless communications device and the working frequency of the second wireless communications device is less than or equal to a second threshold.

It should be noted that the receiving performance includes receiving sensitivity, a receiving range, a receiving blocking index, and the like.

In this embodiment of the present invention, due to a limit of the preset threshold, the interference caused by the first wireless communications device to the receiving performance of the second wireless communications device can be suppressed under the first condition, so that a coexistence requirement of the first wireless communications device and the second wireless communications device can be met.

With reference to the first aspect of the embodiments of the present invention, in a first implementation of the first aspect of the embodiments of the present invention, the maximum transmit power corresponding to the first wireless communications device includes a maximum configured transmit power $P_{CMAX,c}$ of a carrier of the first wireless communications device.

In this embodiment of the present invention, a maximum configured transmit power of a carrier may be adjusted to reduce interference, so that an implementation of reducing interference between devices is provided, thereby improving implementability of the solution.

With reference to the first implementation of the first aspect of the embodiments of the present invention, in a second implementation of the first aspect of the embodiments of the present invention, the first wireless communications device may adjust a maximum configured transmit power $P_{CMAX,c}$ of a target carrier of the first wireless communications device according to the following formulas:

$$P_{CMAX\_L,c} \leq P_{CMAX,c} \leq P_{CMAX\_H,c};$$

$$P_{CMAX\_L,c} = \text{MIN}\left\{P_{EMAX,c} - \Delta T_{C,c},\right.$$

-continued $$P_{PowerClass} - \text{MAX}\begin{pmatrix} MPR_c + A - MPR_c, +\Delta T_{IB,c} + \\ \Delta T_{C,c} + \Delta T_{ProSe}, P - MPR_c \end{pmatrix}$$

and $$P_{CMAX\_H,c} = \text{MIN}\{P_{EMAX,c}, P_{PowerClass}\},$$

where $P_{EMAX,c}$ is a power value delivered at a radio resource control (Radio Resource Control, RRC) layer for the target carrier, $P_{EMAX,c}$ is equal to the preset threshold, $\Delta T_{C,c}$ is a first power loss value, $P_{PowerClass}$ is a power class of the first wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, and $P\text{-}MPR_c$ is a third power reduction value.

It should be understood that the target carrier is any carrier corresponding to the first wireless communications device, the first power loss value is a power loss caused on the target carrier by flatness of a filter of the first wireless communications device, the second power loss value and the third power loss value are power losses caused by an extra filter, the first power reduction value is a maximum power reduction value corresponding to the target carrier, the second power reduction value is an extra maximum power reduction value corresponding to the target carrier, and the third power reduction value is a power reduction caused on the target carrier by power sharing between a plurality of wireless connections corresponding to the first wireless communications device.

This embodiment of the present invention provides a specific manner of adjusting the maximum configured transmit power of the carrier, thereby improving implementability of the solution.

With reference to the first implementation of the first aspect of the embodiments of the present invention, in a third implementation of the first aspect of the embodiments of the present invention, the first wireless communications device may adjust a maximum configured transmit power $P_{CMAX,c}$ of a target carrier of the first wireless communications device according to the following formulas:

$$P_{CMAX\_L,c} \le P_{CMAX,c} \le P_{CMAX\_H,c};$$

$$P_{CMAX\_L,c} = \text{MIN}\left\{P_{EMAX,c} - \Delta T_{C,c},\right.$$

$$\left.P_{PowerClass} - \text{MAX}\begin{pmatrix} MPR_c + A - MPR_c, +\Delta T_{IB,c} + \\ \Delta T_{C,c} + \Delta T_{ProSe}, P - MPR_c \end{pmatrix}, P_{Regulatory,c}\right\};$$

and $$P_{CMAX\_H,c} = \text{MIN}\{P_{EMAX,c}, P_{PowerClass}, P_{Regulatory,c}\},$$

where $P_{EMAX,c}$ is a power value delivered at an RRC layer for the target carrier, $\Delta T_{C,c}$ is a first power loss value, $P_{PowerClass}$ is a power class of the first wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, and $P_{Regulatory,c}$ is equal to the preset threshold.

This embodiment of the present invention provides another specific manner of adjusting the maximum configured transmit power of the carrier, thereby improving flexibility of the solution.

With reference to the third implementation of the first aspect of the embodiments of the present invention, in a fourth implementation of the first aspect of the embodiments of the present invention, $$P_{Regulatory,c} = P_{PowerClass} - PCR_c,$$

where $PCR_c$ is a preset power reduction value of the carrier.

This embodiment of the present invention provides another specific manner of adjusting the maximum configured transmit power of the carrier, thereby improving flexibility of the solution.

With reference to the third implementation of the first aspect of the embodiments of the present invention, in a fifth implementation of the first aspect of the embodiments of the present invention, $$P_{Regulatory,c} = EIRP\_P_{Regulatory,c} - G_{Ant}; \text{ or}$$

$$P_{Regulatory,c} = EIRP\_PSD_{Regulatory,c} - G_{Ant} + 10 \lg BW,$$

where $EIRP\_P_{Regulatory,c}$ is a preset equivalent isotropically radiated power value of the carrier, $G_{Ant}$ is an antenna gain of the first wireless communications device, and $EIRP\_PSD_{Regulatory,c}$ is a preset equivalent isotropically radiated power spectrum density value of the carrier.

In this embodiment of the present invention, an equivalent isotropically radiated power value of the carrier may be set, to adjust the maximum configured transmit power of the carrier, so that the device meets a coexistence requirement, thereby improving flexibility of the solution.

With reference to the third implementation of the first aspect of the embodiments of the present invention, in a sixth implementation of the first aspect of the embodiments of the present invention, $$P_{Regulatory,c} = PSD_{Regulatory,c} + 10 \lg BW,$$

where $PSD_{Regulatory,c}$ is a preset power spectrum density value of the carrier, and BW is a bandwidth occupied by the target carrier.

In this embodiment of the present invention, a power spectrum density value of the carrier may be set, to adjust the maximum configured transmit power of the carrier, so that the device meets a coexistence requirement, thereby improving flexibility of the solution.

With reference to the second implementation of the first aspect of the embodiments of the present invention, in a seventh implementation of the first aspect of the embodiments of the present invention, the first wireless communications device may adjust a maximum configured transmit power $P_{CMAX,c}$ of a target carrier of the first wireless communications device according to the following formulas:

$$P_{CMAX\_L,c} \le P_{CMAX,c} \le P_{CMAX\_H,c};$$

$$P_{CMAX\_L,c} = $$

$$\text{MIN}\left\{P_{EMAX,c} - \Delta T_{C,c}, P_{PowrClass} - \text{MAX}\begin{pmatrix} MPR_c + A - MPR_c + \\ \Delta T_{IB,c} + \Delta T_{C,c} + \Delta T_{ProSe}, \\ P - MPR_c \end{pmatrix},\right.$$

$$\left. P_{Regulatory,c}, PSD_{Regulatory,c} + 10 \lg BW \right\};$$

and $$P_{CMAX\_H,c} = \text{MIN}\{P_{EMAX,c}, P_{PowerClass}, P_{Regulatory,c}, PSD_{Regulatory,c} + 10 \lg BW\},$$

where $P_{EMAX,c}$ is a power value delivered at an RRC layer for the target carrier, $\Delta T_{C,c}$ is a first power loss value, $P_{PowerClass}$ is a power class of the first wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, $P_{Regulatory,c}$ is the present threshold, and $PSD_{Regulatory,c}$ is a preset power spectrum density value of the carrier.

In this embodiment of the present invention, both a configured transmit power of the carrier and a power spectrum density of the carrier can be limited, to meet a coexistence requirement, thereby improving flexibility of the solution.

With reference to the first aspect of the embodiments of the present invention, in an eighth implementation of the first aspect of the embodiments of the present invention, the maximum transmit power corresponding to the first wireless communications device includes a maximum configured transmit power $P_{CMAX}$ of the first wireless communications device.

In this embodiment of the present invention, the maximum configured transmit power of the first wireless communications device may be adjusted, to suppress interference caused by the first wireless communications device to the receiving performance of the second wireless communications device, so that an implementation meeting a coexistence requirement is provided, thereby improving implementability of the solution.

With reference to the eighth implementation of the first aspect of the embodiments of the present invention, in a ninth implementation of the first aspect of the embodiments of the present invention, the first wireless communications device may adjust the maximum configured transmit power $P_{CMAX}$ of the first wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C, \right.$$
$$\left. P_{PowrClass} - \text{MAX}\begin{pmatrix} MPR + A - MPR + \\ \Delta T_{IB,c} + \Delta T_C + \Delta T_{ProSe}, \\ P - MPR \end{pmatrix}\right\};$$

and $$P_{CMAX\_H} = \text{MIN}\{10\log_{10}\Sigma p_{EMAX,c}, P_{PowerClass}\},$$

where $10\log_{10}\Sigma p_{EMAX,c}$ is equal to the preset threshold, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, and $P_{EMAX,c}$ is a power value delivered at an RRC layer for a carrier corresponding to the first wireless communications device.

It should be understood that the fourth power loss value is a power loss caused on the first wireless communications device by flatness of a filter of the first wireless communications device, the second power loss value and the third power loss value are power losses caused by an extra filter, the fourth power reduction value is a maximum power reduction value corresponding to the first wireless communications device, the fifth power reduction value is an extra maximum power reduction value corresponding to the first wireless communications device, and the sixth power reduction value is a power reduction caused on the first wireless communications device by power sharing between a plurality of wireless connections corresponding to the first wireless communications device.

This embodiment of the present invention provides a specific manner of adjusting the maximum configured transmit power of the first wireless communications device, thereby improving implementability of the solution.

With reference to the eighth implementation of the first aspect of the embodiments of the present invention, in a tenth implementation of the first aspect of the embodiments of the present invention, the first wireless communications device may adjust the maximum configured transmit power $P_{CMAX}$ of the first wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C, \right.$$
$$\left. P_{PowrClass} - \text{MAX}\begin{pmatrix} MPR + A - MPR + \\ \Delta T_{IB,c} + \Delta T_C + \Delta T_{ProSe}, \\ P - MPR \end{pmatrix}, P_{Regulatory}\right\};$$

and $$P_{CMAX\_H} = \text{MIN}\{10\log_{10}\Sigma p_{EMAX,c}, P_{PowerClass}, P_{Regulatory}\},$$

where $P_{EMAX,c}$ is a power value delivered at RRC for a carrier corresponding to the first wireless communications device, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, and $P_{Regulatory}$ is equal to the preset threshold.

This embodiment of the present invention provides another specific manner of adjusting the maximum configured transmit power of the first wireless communications device, thereby improving flexibility of the solution.

With reference to the tenth implementation of the first aspect of the embodiments of the present invention, in an eleventh implementation of the first aspect of the embodiments of the present invention, $$P_{Regulatory} = P_{PowerClass} - PCR,$$

where

PCR is a preset power reduction value of the device.

This embodiment of the present invention provides another specific manner of adjusting the maximum configured transmit power of the first wireless communications device, thereby improving flexibility of the solution.

With reference to the tenth implementation of the first aspect of the embodiments of the present invention, in a twelfth implementation of the first aspect of the embodiments of the present invention, $$P_{Regulatory} = EIRP\_P_{Regulatory} - G_{Ant};\text{ or}$$

$$P_{Regulatory} = EIRP\_PSD_{Regulatory} - G_{Ant} 10 \lg BW,$$

where $EIRP\_P_{Regulatory}$ is a preset equivalent isotropically radiated power value of the device, $G_{Ant}$ is an antenna gain of the first wireless communications device, and $EIRP\_PSD_{Regulatory}$ is a preset equivalent isotropically radiated power spectrum density value of the device.

In this embodiment of the present invention, an equivalent isotropically radiated power value of the device may be set, to adjust the maximum configured transmit power of the device, so that the device meets a coexistence requirement, thereby improving flexibility of the solution.

With reference to the tenth implementation of the first aspect of the embodiments of the present invention, in a thirteenth implementation of the first aspect of the embodiments of the present invention, $$P_{Regulatory} = PSD_{Regulatory} + 10 \lg BW,$$

where $PSD_{Regulatory}$ is a preset power spectrum density value of the device, and BW is a bandwidth occupied by the first wireless communications device.

In this embodiment of the present invention, a power spectrum density value of the device may be set, to adjust the maximum configured transmit power of the device, so that the device meets a coexistence requirement, thereby improving flexibility of the solution.

With reference to the tenth implementation of the first aspect of the embodiments of the present invention, in a fourteenth implementation of the first aspect of the embodiments of the present invention, the first wireless communications device may adjust the maximum configured transmit power $P_{CMAX}$ of the first wireless communications device according to the following formulas:

$$P_{CMAX\_L} \le P_{CMAX} \le P_{CMAX\_H};$$

$$P_{CMAX\_L} = \text{MIN}\left\{ 10 \log_{10} \sum p_{EMAX,c} - \Delta T_C, P_{PowrClass} - \text{MAX}\left( \begin{array}{c} MPR + A - MPR + \\ \Delta T_{IB,c} + \Delta T_C + \Delta T_{ProSe}, \\ P - MPR \end{array} \right), P_{Regulatory}, PSD_{Regulatory} + 10 \lg BW \right\};$$

and $$P_{CMAX\_H} = \text{MIN}\{10 \log_{10} \Sigma p_{EMAX,c}, P_{PowerClass}, P_{Regulatory}, PSD_{Regulatory} + 10 \lg BW\},$$

where $P_{EMAX,c}$ is a power value delivered at an RRC layer for a carrier corresponding to the first wireless communications device, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, $P_{Regulatory}$ is the preset threshold, and $P_{Regulatory}$ is a preset power spectrum density value of the device.

In this embodiment of the present invention, both a power spectrum density of a device and a configured transmit power of the device may be limited, to meet a coexistence requirement, thereby improving flexibility of the solution.

With reference to the first aspect, and the first to the fourteenth implementations of the first aspect of the embodiments of the present invention, in a fifteenth implementation of the first aspect of the embodiments of the present invention, the first condition further includes that an angle difference between an antenna direction of the first wireless communications device and an antenna direction of second wireless communication is less than or equal to a third threshold.

With reference to the first aspect of the embodiments of the present invention, in a sixteenth implementation of the first aspect of the embodiments of the present invention, when the first wireless communications device determines that the first condition is met, if the first wireless communications device determines that the maximum transmit power corresponding to the first wireless communications device is not greater than the preset threshold, the first wireless communications device performs another process.

With reference to the sixteenth implementation of the first aspect of the embodiments of the present invention, in a seventeenth implementation of the first aspect of the embodiments of the present invention, the first wireless communications device may determine a maximum configured transmit power $P_{CMAX,c}$ of a target carrier of the first wireless communications device according to the following formulas:

$$P_{CMAX\_L,c} \le P_{CMAX,c} \le P_{CMAX\_H,c};$$

$$P_{CMAX\_L,c} = \text{MIN}\left\{ P_{EMAX,c} - \Delta T_{C,c}, P_{PowrClass} - \text{MAX}\left( \begin{array}{c} MPR_c + A - MPR_c + \\ \Delta T_{IB,c} + \Delta T_{C,c} + \Delta T_{ProSe}, \\ P - MPR_c \end{array} \right) \right\};$$

and $$P_{CMAX\_H,c} = \text{MIN}\{P_{EMAX,c}, P_{PowerClass}\},$$

where $P_{EMAX,c}$ is a power value delivered at an RRC layer for the target carrier, $P_{EMAX,c}$ is less than the preset threshold, $\Delta T_{C,c}$ is a first power loss value, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, and $P_{PowerClass}$ is a power class of the first wireless communications device.

With reference to the sixteenth implementation of the first aspect of the embodiments of the present invention, in an eighteenth implementation of the first aspect of the embodiments of the present invention, the first wireless communications device may determine a maximum configured transmit power $P_{CMAX,c}$ of a target carrier of the first wireless communications device according to the following formulas:

$$P_{CMAX\_L,c} \leq P_{CMAX,c} \leq P_{CMAX\_H,c};$$

$$P_{CMAX\_L,c} = \text{MIN}\left\{P_{EMAX,c} - \Delta T_{C,c},\right.$$
$$\left. P_{PowrClass} - \text{MAX}\begin{pmatrix} MPR_c + A - MPR_c + \\ \Delta T_{IB,c} + \Delta T_{C_c} + \Delta T_{ProSe} \\ P - MPR_c \end{pmatrix}, P_{Regulatory,c}\right\};$$

and $$P_{CMAX\_H,c} = \text{MIN}\{P_{EMAX,c}, P_{PowerClass}, P_{Regulatory,c}\}$$

where $P_{EMAX,c}$ is a power value delivered at an RRC layer for the target carrier, $\Delta T_{C,c}$ is a first power loss value, $P_{PowerClass}$ is a power class of the first wireless communications device, $MPR_c$ is a first power reduction value, A-$MPR_c$ is a second power reduction value, $\Delta T_{IB,c}$ is a second power loss value, $\Delta T_{ProSe}$ is a third power loss value, P-$MPR_c$ is a third power reduction value, and $P_{Regulatory,c}$ is equal to the preset threshold.

With reference to the eighteenth implementation of the first aspect of the embodiments of the present invention, in a nineteenth implementation of the first aspect of the embodiments of the present invention, $$P_{Regulatory,c} = P_{PowerClass} - PCR_c; \text{ or}$$

$$P_{Regulatory,c} = EIRP\_P_{Regulatory,c} - G_{Ant}; \text{ or}$$

$$P_{Regulatory,c} = PSD_{Regulatory,c} + 10 \lg BW; \text{ or}$$

$$P_{Regulatory,c} = EIRP\_PSD_{Regulatory,c} - G_{Ant} + 10 \lg BW,$$

where $PCR_c$ is a preset power reduction value of the carrier, EIRP\_$P_{Regulatory,c}$ is a preset equivalent isotropically radiated power value of the carrier, $G_{Ant}$ is an antenna gain of the first wireless communications device, $PSD_{Regulatory,c}$ is a preset power spectrum density value of the carrier, BW is a bandwidth occupied by the target carrier, and EIRP\_$PSD_{Regulatory,c}$ is a preset equivalent isotropically radiated power spectrum density value of the carrier.

With reference to the sixteenth implementation of the first aspect of the embodiments of the present invention, in a twentieth implementation of the first aspect of the embodiments of the present invention, the first wireless communications device may determine the maximum configured transmit power $P_{CMAX}$ of the first wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C,\right.$$
$$\left. P_{PowrClass} - \text{MAX}\begin{pmatrix} MPR + A - MPR + \\ \Delta T_{IB,c} + \Delta T_C + \Delta T_{ProSe} \\ P - MPR \end{pmatrix}\right\};$$

and $$P_{CMAX\_H} = \text{MIN}\{10 \log_{10} \Sigma p_{EMAX,c}, P_{PowerClass}\},$$

where $P_{EMAX,c}$ is a power value delivered at an RRC layer for a carrier corresponding to the first wireless communications device, $10 \log_{10} \Sigma p_{EMAX,c}$ is less than the preset threshold, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, and P-MPR is a sixth power reduction value.

With reference to the sixteenth implementation of the first aspect of the embodiments of the present invention, in a twenty-first implementation of the first aspect of the embodiments of the present invention, the first wireless communications device may determine the maximum configured transmit power $P_{CMAX}$ of the first wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C,\right.$$
$$\left. P_{PowrClass} - \text{MAX}\begin{pmatrix} MPR + A - MPR + \\ \Delta T_{IB,c} + \Delta T_C + \Delta T_{ProSe} \\ P - MPR \end{pmatrix}, P_{Regulatory}\right\};$$

and $$P_{CMAX\_H} = \text{MIN}\{10 \log_{10} \Sigma p_{EMAX,c}, P_{PowerClass}, P_{Regulatory}\},$$

where $P_{EMAX,c}$ is a power value delivered at an RRC layer for a carrier corresponding to the first wireless communications device, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, and $P_{Regulatory}$ is equal to the preset threshold.

With reference to the twenty-first implementation of the first aspect of the embodiments of the present invention, in a twenty-second implementation of the first aspect of the embodiments of the present invention.

$$P_{Regulatory} = P_{PowerClass} - PCR; \text{ or}$$

$$P_{Regulatory} = EIRP\_P_{Regulatory} - G_{Ant}; \text{ or}$$

$$P_{Regulatory} = PSD_{Regulatory} + 10 \lg BW; \text{ or}$$

$$P_{Regulatory} = EIRP\_PSD_{Regulatory} - G_{Ant} + 10 \lg BW,$$

where

PCR is a preset power reduction value of the device, EIRP\_$P_{Regulatory}$ is a preset equivalent isotropically radiated power value of the device, $G_{Ant}$ is an antenna gain of the first wireless communications device, $PSD_{Regulatory}$ is a preset power spectrum density value of the device, BW is a bandwidth occupied by the first wireless communications device, and EIRP\_$PSD_{Regulatory}$ is a preset equivalent isotropically radiated power spectrum density value of the device.

According to a second aspect, an embodiment of the present invention provides a wireless communications device, where the wireless communications device includes:

a first determining module, configured to determine a distance between the wireless communications device and a second wireless communications device;

a second determining module, configured to determine a working frequency of the second wireless communications device; and an adjustment module, configured to: when it is determined that a first condition is met and that a maximum transmit power corresponding to the wireless communications device is greater than a preset threshold, adjust the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance is less than or equal to a first threshold, and a difference between a working frequency of the wireless communications device and the working frequency of the second wireless communications device is less than or equal to a second threshold.

With reference to the second aspect of the embodiments of the present invention, in a first implementation of the second aspect of the embodiments of the present invention, the maximum transmit power corresponding to the wireless communications device includes a maximum configured transmit power $P_{CMAX,c}$ of a carrier of the wireless communications device.

With reference to the first implementation of the second aspect of the embodiments of the present invention, in a second implementation of the second aspect of the embodiments of the present invention, the adjustment module includes:

a first adjustment unit, configured to adjust a maximum configured transmit power $P_{CMAX,c}$ of a target carrier of the wireless communications device according to the following formulas:

$$P_{CMAX\_L,c} \leq P_{CMAX,c} \leq P_{CMAX\_H,c};$$

$$P_{CMAX\_L,c} = \text{MIN}\left\{P_{EMAX,c} - \Delta T_{C,c}, P_{PowrClass} - \text{MAX}\begin{pmatrix} MPR_c + A - MPR_c + \\ \Delta T_{IB,c} + \Delta T_{C,c} + \Delta T_{ProSe}, \\ P - MPR_c \end{pmatrix}\right\};$$

and $$P_{CMAX\_H,c} = \text{MIN}\{P_{EMAX,c}, P_{PowerClass}\},$$

where $P_{EMAX,c}$ is a power value delivered at a radio resource control RRC layer for the target carrier, $P_{EMAX,c}$ is equal to the preset threshold, $\Delta T_{C,c}$ is a first power loss value, $P_{PowerClass}$ is a power class of the wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, and $P\text{-}MPR_c$ is a third power reduction value.

With reference to the first implementation of the second aspect of the embodiments of the present invention, in a third implementation of the second aspect of the embodiments of the present invention, the adjustment module includes:

a second adjustment unit, configured to adjust a maximum configured transmit power $P_{EMAX,c}$ of a target carrier of the wireless communications device according to the following formulas:

$$P_{CMAX\_L,c} \leq P_{CMAX,c} \leq P_{CMAX\_H,c};$$

$$P_{CMAX\_L,c} = \text{MIN}\left\{P_{EMAX,c} - \Delta T_{C,c}, P_{PowrClass} - \text{MAX}\begin{pmatrix} MPR_c + A - MPR_c + \\ \Delta T_{IB,c} + \Delta T_{C,c} + \Delta T_{ProSe}, \\ P - MPR_c \end{pmatrix}, P_{Regulatory,c}\right\};$$

and $$P_{CMAX\_H,c} = \text{MIN}\{P_{EMAX,c}, P_{PowerClass}, P_{Regulatory,c}\},$$

where $P_{EMAX,c}$ is a power value delivered at a radio resource control RRC layer for the target carrier, $\Delta T_{C,c}$ is a first power loss value, $P_{PowerClass}$ is a power class of the wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, and $P_{Regulatory,c}$ is equal to the preset threshold.

With reference to the third implementation of the second aspect of the embodiments of the present invention, in a fourth implementation of the second aspect of the embodiments of the present invention, $$P_{Regulatory,c} = P_{PowerClass} - PCR_c,$$

where $PCR_c$ is a preset power reduction value of the carrier.

With reference to the third implementation of the second aspect of the embodiments of the present invention, in a fifth implementation of the second aspect of the embodiments of the present invention, $$P_{Regulatory,c} = EIRP\_P_{Regulatory,c} - G_{Ant}; \text{ or}$$

$$P_{Regulatory,c} = EIRP\_PSD_{Regulatory,c} - G_{Ant} + 10 \lg BW,$$

where $EIRP\_P_{Regulatory,c}$ is a preset equivalent isotropically radiated power value of the carrier, $G_{Ant}$ is an antenna gain of the wireless communications device, and $EIRP\_PSD_{Regulatory,c}$ is a preset equivalent isotropically radiated power spectrum density value of the carrier.

With reference to the third implementation of the second aspect of the embodiments of the present invention, in a sixth implementation of the second aspect of the embodiments of the present invention, $$P_{Regulatory,c} = PSD_{Regulatory,c} + 10 \lg BW,$$

where $PSD_{Regulatory,c}$ is a preset power spectrum density value of the carrier, and BW is a bandwidth occupied by the target carrier.

With reference to the first implementation of the second aspect of the embodiments of the present invention, in a seventh implementation of the second aspect of the embodiments of the present invention, the maximum transmit power corresponding to the wireless communications device includes a maximum configured transmit power $P_{CMAX}$ of the wireless communications device.

With reference to the seventh implementation of the second aspect of the embodiments of the present invention, in an eighth implementation of the second aspect of the embodiments of the present invention, the adjustment module includes:

a third adjustment unit, configured to adjust the maximum configured transmit power of the wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C, \right.$$

$$\left. P_{PowrClass} - \text{MAX}\begin{pmatrix} MPR + A - MPR + \\ \Delta T_{IB,c} + \Delta T_C + \Delta T_{ProSe}, \\ P - MPR \end{pmatrix}\right\};$$

and $$P_{CMAX\_H} = \text{MIN}\{10\log_{10}\Sigma p_{EMAX,c}, P_{PowerClass}\},$$

where $p_{EMAX,c}$ is a power value delivered at radio resource control RRC for a carrier corresponding to the wireless communications device, $10\log_{10}\Sigma p_{EMAX,c}$ is equal to the preset threshold, $\Delta T_C$ is a fourth power loss value, $P_{PowerClass}$ is a power class of the wireless communications device, MPR is a fourth power reduction value, A-MPR is a fifth power reduction value, $\Delta T_{IB,c}$ is a second power loss value, $\Delta T_{ProSe}$ is a third power loss value, and P-MPR is a sixth power reduction value.

With reference to the seventh implementation of the second aspect of the embodiments of the present invention, in a ninth implementation of the second aspect of the embodiments of the present invention, the adjustment module includes:

a fourth adjustment unit, configured to adjust the maximum configured transmit power of the wireless communications device according to the following formulas:

$$P_{CMAX\_L} \leq P_{CMAX} \leq P_{CMAX\_H};$$

$$P_{CMAX\_L} = \text{MIN}\left\{10\log_{10}\sum p_{EMAX,c} - \Delta T_C, \right.$$

$$\left. P_{PowrClass} - \text{MAX}\begin{pmatrix} MPR + A - MPR + \\ \Delta T_{IB,c} + \Delta T_C + \Delta T_{ProSe}, \\ P - MPR \end{pmatrix}, P_{Regulatory}\right\};$$

and $$P_{CMAX\_H} = \text{MIN}\{10\log_{10}\Sigma p_{EMAX,c}, P_{PowerClass}, P_{Regulatory}\},$$

where $p_{EMAX,c}$ is a power value delivered at a radio resource control RRC layer for a carrier corresponding to the wireless communications device, $\Delta T_C$ is a fourth power loss value, $P_{PowerClass}$ is a power class of the wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, and $P_{Regulatory}$ is equal to the preset threshold.

With reference to the ninth implementation of the second aspect of the embodiments of the present invention, in a tenth implementation of the second aspect of the embodiments of the present invention, $$P_{Regulatory} = P_{PowerClass} - PCR,$$

where

PCR is a preset power reduction value of the device.

With reference to the ninth implementation of the second aspect of the embodiments of the present invention, in an eleventh implementation of the second aspect of the embodiments of the present invention, $$P_{Regulatory} = EIRP\_P_{Regulatory} - G_{Ant},$$

where $EIRP\_P_{Regulatory}$ is a preset equivalent isotropically radiated power value of the device, and $G_{Ant}$ is an antenna gain of the wireless communications device.

With reference to the ninth implementation of the second aspect of the embodiments of the present invention, in a twelfth implementation of the second aspect of the embodiments of the present invention, $$P_{Regulatory} = PSD_{Regulatory} + 101 \, g \, BW; \text{ or}$$

$$P_{Regulatory} = EIRP\_PSD_{Regulatory} - G_{Ant} + 101 \, g \, BW,$$

where $PSD_{Regulatory}$ is a preset power spectrum density value of the device, BW is a bandwidth occupied by the wireless communications device, and $EIRP\_PSD_{Regulatory}$ is a preset equivalent isotropically radiated power spectrum density value of the device.

With reference to the second aspect of the embodiments of the present invention, and the first to the twelfth implementations of the second aspect, in a thirteenth implementation of the second aspect of the embodiments of the present invention, the first condition further includes that an angle difference between an antenna direction of the wireless communications device and an antenna direction of the second wireless communications device is less than or equal to a third threshold.

According to a third aspect, an embodiment of the present invention provides a wireless communications device, including an input device, an output device, a processor, and a memory, where the memory is configured to store a program; and
the processor is configured to execute the program in the memory, to specifically perform the following steps:

determining a distance between the wireless communications device and a second wireless communications device;

determining a working frequency of the second wireless communications device; and when the wireless communications device determines that a first condition is met, if the wireless communications device determines that a maximum transmit power corresponding to the wireless communications device is greater than a preset threshold, adjusting the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance is less than or equal to a first threshold, and a difference between a working frequency of the wireless communications device and the working frequency of the second wireless communications device is less than or equal to a second threshold.

It can be learned from the foregoing technical solutions that the embodiments of the present invention have the following advantages:

In the embodiments of the present invention, when the first wireless communications device determines that the first condition is met, if the maximum transmit power corresponding to the first wireless communications device is greater than the preset threshold, the maximum transmit power corresponding to the first wireless communications device is adjusted, so that the adjusted maximum transmit power is less than or equal to the preset threshold, where the first condition includes that the distance between the first wireless communications device and the second wireless communications device is less than or equal to the first threshold, and the difference between the working frequency of the first wireless communications device and the working frequency of the second wireless communications device is less than or equal to the second threshold. Therefore, the preset threshold is set, so that the interference caused by the first wireless communications device to the receiving performance of the second wireless communications device can be suppressed, and a coexistence requirement of the first wireless communications device and the second wireless communications device under the first condition can be met. In other words, according to the solution, interference between devices can be suppressed, and a coexistence requirement of a plurality of devices can be met.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of this application.

DESCRIPTION OF EMBODIMENTS

Figure 1:
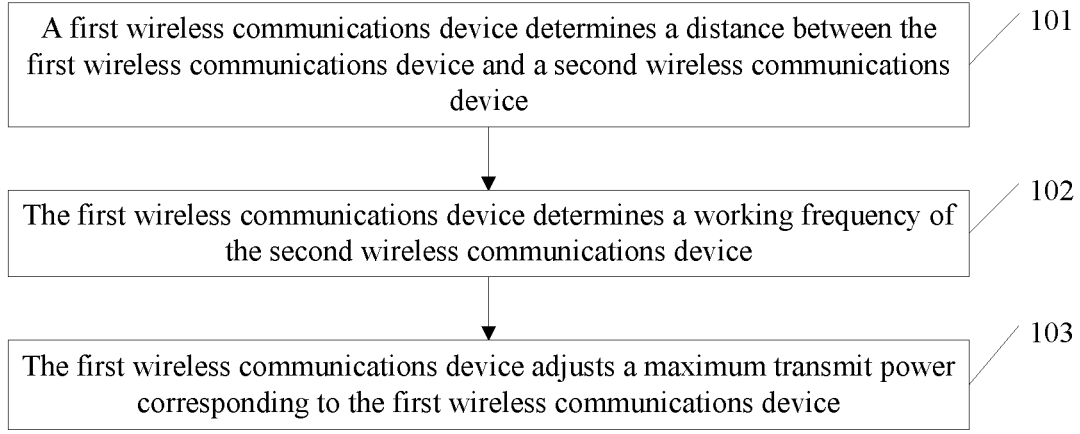
FIG. 1 is a flowchart of a transmit power determining method according to an embodiment of the present invention.

In the description, claims, and accompanying drawings of the present disclosure, the terms "first", "second", "third", "fourth", and so on (if existing) are intended to distinguish between similar objects but do not necessarily indicate a specific order or sequence. It should be understood that the data termed in such a way is interchangeable in proper circumstances, so that embodiments of the present invention described herein can be implemented in an order other than the order illustrated or described herein. Moreover, the terms "include", "have", and any other variants thereof are intended to cover a non-exclusive inclusion. For example, a process, a method, a system, a product, or a device that includes a series of steps or units is not necessarily limited to those expressly listed steps or units, but may include other steps or units that are not expressly listed or inherent to such a process, a method, a system, a product, or a device.

It should be understood that a transmit power determining method and a wireless communications device in the embodiments of the present invention may be applied to various communications systems, for example, a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), and a Worldwide Interoperability for Microwave Access (Worldwide Interoperability for Microwave Access, WiMAX) communications system.

It should be understood that the communications device in the embodiments of the present invention includes but is not limited to user equipment (User Equipment, UE), a mobile station (Mobile Station, MS), a mobile terminal (Mobile Terminal), a mobile phone (Mobile Telephone), a handset (handset), portable equipment (portable equipment), and an automatic toll (tolling) device. The communications device may communicate with one or more core networks through a radio access network (Radio Access Network). For example, the communications device may be a mobile phone (or referred to as a "cellular" phone), or a computer having a wireless communication function. The communications device may alternatively be a portable, pocket-sized, handheld, computer built-in, or in-vehicle mobile apparatus.

Embodiments of the present invention provide a transmit power determining method and a wireless communications device, to suppress interference between devices, and meet a coexistence requirement of a plurality of devices.

It should be understood that in addition to a scenario in which an ITS terminal and an automatic toll device coexist, the method and the wireless communications device in the embodiments of the present invention are also applicable to a scenario in which other wireless communications devices coexist. This is not specifically limited in the embodiments of the present invention.

For ease of understanding of embodiments of the present invention, the following describes some parameters in the embodiments of the present invention.

A radio access system is divided into three layers. A first layer is a physical (Physical, PHY) layer, a second layer is a Media Access Control (Media Access Control, MAC) sub-layer, a radio link control (Radio Link Control, RLC) sub-layer, and a Packet Data Convergence Protocol (Packet Data Convergence Protocol, PDCP) sub-layer, and a third layer is a radio resource control (Radio Resource Control, RRC) layer. The RRC layer in the embodiments of the present invention is the third layer of the wireless communications system accessed by a first wireless communications device. $P_{EMAX,c}$ is a power value delivered by the system, in signaling of the RRC layer, for a carrier corresponding to the first wireless communications device. $\Sigma p_{EMAX,c}$ is a sum of power values delivered by the system, in signaling of the RRC layer, for all carriers corresponding to first wireless communication.

A wireless communications device includes a radio frequency filter, and unflatness of the radio frequency filter causes a power loss. A first power loss value $\Delta T_{C,c}$ is a power loss caused on a target carrier by flatness of the radio frequency filter of the first wireless communications device. A fourth power loss value $\Delta T_C$ is a maximum value in power loss values caused by the flatness of the radio frequency filter of the first wireless communications device on all carriers. For specific definitions and values of $\Delta T_{C,c}$ and $\Delta T_C$, refer to 3GPP TS 36.101. Details are not described herein again.

A second power loss value $\Delta T_{IB,c}$ and a third power loss value $\Delta T_{ProSe}$ are power losses caused on the first wireless communications device by a filter that is added to meet a requirement, such as transmission on a plurality of frequency bands at the same time. For specific definitions and values of $\Delta T_{IB,c}$ and $\Delta T_{ProSe}$ refer to 3GPP TS 36.101. Details are not described herein again.

A first power reduction value $MPR_c$ is a maximum power reduction value corresponding to the target carrier, a second power reduction value $A\text{-}MPR_c$ is an extra maximum power reduction value corresponding to the target carrier, a third power reduction value $P\text{-}MPR_c$ is a power reduction caused on the target carrier by power sharing between a plurality of wireless connections corresponding to the first wireless communications device, a fourth power reduction value MPR is a maximum power reduction value corresponding to the first wireless communications device, a fifth power reduction value A-MPR is an extra maximum power reduction value corresponding to the first wireless communications device, and a sixth power reduction value P-MPR is a power reduction caused on the first wireless communications device by power sharing between a plurality of wireless connections corresponding to the first wireless communications device. For specific definitions of $MPR_c$, $A\text{-}MPR_c$, $P\text{-}MPR_c$, MPR, A-MPR, and P-MPR, refer to 3GPP TS 36.101. Details are not described herein again.

A transmit power determining method according to an embodiment of the present invention is described below. Referring to FIG. 1, a transmit power determining method according to an embodiment of the present invention includes the following steps.

101: A first wireless communications device determines a distance between the first wireless communications device and a second wireless communications device.

After the first wireless communications device and the second wireless communications device access a wireless communications system, the first wireless communications device may obtain a location of the second wireless communications device, and then determine the distance between the first wireless communications device and the second wireless communications device based on the location of the second wireless communications device and the location of the first wireless communications device. Specifically, the first wireless communications device may determine the location of the second wireless communications device by querying a database, may determine the location of the second wireless communications device by using a received signal sent by the second wireless communications device, or may determine the location of the second wireless communications device in another manner, and this is not specifically limited herein.

It should be understood that a process of determining, by the first wireless communications device, the distance between the first wireless communications device and the second wireless communications device is a dynamic process. The distance should change as the first wireless communications device and/or the second wireless communications device move/moves, and the first wireless communications device may regularly or irregularly obtain the distance.

102: The first wireless communications device determines a working frequency of the second wireless communications device.

The second wireless communications device works on a particular frequency band. The first wireless communications device may determine the working frequency of the second wireless communications device by querying the database, or may determine the working frequency of the second wireless communications device by using a received signal sent by the second wireless communications device, or may determine the working frequency of the second wireless communications device in another manner, and this is not specifically limited herein. After determining the working frequency of the second wireless communications device, the first wireless communications device can determine a difference between a working frequency of the first wireless communications device and the working frequency of the second wireless communications device.

103: The first wireless communications device adjusts a maximum transmit power corresponding to the first wireless communications device.

After determining the distance between the first wireless communications device and the second wireless communications device, and the difference between the working frequency of the first wireless communications device and the working frequency of the second wireless communications device, the first wireless communications device can determine whether a first condition is met. The first condition includes that the distance between the first wireless communications device and the second wireless communications device is less than or equal to a first threshold, and the difference between the working frequency of the first wireless communications device and the working frequency of the second wireless communications device is less than or equal to a second threshold. When the first wireless communications device determines that the first condition is met, the first wireless communications device determines whether the maximum transmit power corresponding to the first wireless communications device is greater than a preset threshold, and if the maximum transmit power is greater than the preset threshold, the first wireless communications device adjusts the maximum transmit power, so that the adjusted maximum transmit power is less than or equal to the preset threshold.

It should be understood that the first threshold and the second threshold are set based on a condition of generating interference between the first wireless communications device and the second wireless communications device. To be specific, when the first wireless communications device and the second wireless communications device meet the first condition, interference is generated between the first wireless communications device and the second wireless communications device, and a specific value may be determined through testing or in another manner. The preset threshold is used to suppress, under the first condition, interference caused by the first wireless communications device to receiving performance of the second wireless communications device.

In this embodiment of the present invention, when the first wireless communications device determines that the first condition is met, if the maximum transmit power corresponding to the first wireless communications device is greater than the preset threshold, the maximum transmit power corresponding to the first wireless communications device is adjusted, so that the adjusted maximum transmit power is less than or equal to the preset threshold, where the first condition includes that the distance between the first wireless communications device and the second wireless communications device is less than or equal to the first threshold, and the difference between the working frequency of the first wireless communications device and the working frequency of the second wireless communications device is less than or equal to the second threshold. Therefore, the preset threshold is set, so that the interference caused by the first wireless communications device to the receiving performance of the second wireless communications device can be suppressed, and a coexistence requirement of the first wireless communications device and the second wireless communications device under the first condition can be met. In other words, according to the solution, interference between devices can be suppressed, and a coexistence requirement of a plurality of devices can be met.

Based on the embodiment corresponding to FIG. 1, in addition to that the distance is less than or equal to the first threshold and the working frequency difference is less than or equal to the second threshold, the first condition may further include that an angle difference is less than or equal to a third threshold. The angle difference is an angle difference between an antenna direction of the first wireless communications device and an antenna direction of the second wireless communications device, and the third threshold is set based on the condition of generating interference between the first wireless communications device and the second wireless communications device.

Based on the embodiment corresponding to FIG. 1, the maximum transmit power corresponding to the first wireless communications device may be a maximum configured transmit power of a carrier of the first wireless communications device, may be a maximum configured transmit power of the first wireless communications device, or may be a maximum transmit power that corresponds to the first wireless communications device and that is limited based on another reason. The following separately describes a case in which the maximum transmit power corresponding to the first wireless communications device is the maximum configured transmit power of the carrier and a case in which the maximum transmit power corresponding to the first wireless communications device is the maximum configured transmit power of the device.

Case 1. The maximum transmit power corresponding to the first wireless communications device is the maximum configured transmit power of the carrier.

Mode 1. A value of $P_{EMAX,c}$ is adjusted at an RRC layer.

In another embodiment of the transmit power determining method provided in this embodiment of the present invention, the maximum transmit power corresponding to the first wireless communications device is the maximum configured transmit power $P_{CMAX,c}$ of the carrier of the first wireless communications device, and the first wireless communications device adjusts the maximum transmit power corresponding to the first wireless communications device in the following manner:

For any carrier corresponding to the first wireless communications device, that is, a target carrier, the first wireless communications device adjusts a maximum configured transmit power $P_{CMAX,c}$ of the target carrier according to the following formulas (1) to (3):

$$P_{CMAX\_L,c} \leq P_{CMAX,c} \leq P_{CMAX\_H,c}; \tag{1}$$

$$P_{CMAX\_L,c} = \text{MIN} \left\{ P_{EMAX,c} - \Delta T_{C,c}, P_{PowrClass} - \text{MAX} \begin{pmatrix} MPR_c + A - MPR_c + \\ \Delta T_{IB,c} + \Delta T_{C,c} + \Delta T_{ProSe}, \\ P - MPR_c \end{pmatrix} \right\}; \tag{2}$$

and $$P_{CMAX\_H,c} = \text{MIN}\{P_{EMAX,c}, P_{PowerClass}\} \tag{3}$$

It should be understood that $P_{EMAX,c}$ is a power value delivered at the RRC layer for the target carrier, and the power value is usually set at the RRC layer based on a setting of an operator or another reason. In this embodiment of the present invention, the value of $P_{EMAX,c}$ set based on the operator or another reason is compared with the preset threshold at the RRC layer, and when the value is greater than the preset threshold, the value of $P_{EMAX,c}$ is adjusted to the preset threshold at the RRC layer, and then is delivered to the first wireless communications device by using signaling. In this case, the first wireless communications device determines the maximum configured transmit power of the target carrier according to the formulas (1) to (3), so that the maximum configured transmit power of the target carrier is less than or equal to the preset threshold.

It should be further understood that when the value of $P_{EMAX,c}$ based on the operator or another reason is less than the preset threshold, it indicates that an original maximum configured transmit power that is of the target carrier and that is defined in 3GPP TS 36.101 is not less than the preset threshold. The first wireless communications device does not need to adjust the maximum configured transmit power of the target carrier, the RRC layer directly delivers the value to the first wireless communications device by using signaling, and the first wireless communications device determines the maximum configured transmit power of the target carrier according to the formulas (1) to (3) again.

This embodiment of the present invention provides a specific manner of adjusting the maximum configured transmit power of the carrier of the first wireless communications device, thereby improving implementability of the solution.

Mode 2. A new power is defined.

In another embodiment of the transmit power determining method provided in this embodiment of the present invention, the maximum transmit power corresponding to the first wireless communications device is the maximum configured transmit power $P_{CMAX,c}$ of the carrier of the first wireless communications device, and the first wireless communications device adjusts the maximum transmit power corresponding to the first wireless communications device in the following manner:

For any carrier corresponding to the first wireless communications device, that is, a target carrier, the first wireless communications device adjusts a maximum configured transmit power $P_{CMAX,c}$ of the target carrier according to the following formulas (4) to (6):

$$P_{CMAX\_L,c} \leq P_{CMAX,c} \leq P_{CMAX\_H,c}; \tag{4}$$

$$P_{CMAX\_L,c} = \text{MIN} \left\{ P_{EMAX,c} - \Delta T_{C,c}, \right. \tag{5}$$

$$\left. P_{PowrClass} - \text{MAX} \begin{pmatrix} MPR_c + A - MPR_c + \\ \Delta T_{IB,c} + \Delta T_{C,c} + \Delta T_{ProSe}, \\ P - MPR_c \end{pmatrix}, P_{Regulatory,c} \right\}$$

and $$P_{CMAX\_H,c} = \text{MIN}\{P_{EMAX,c}, P_{PowerClass}, P_{Regulatory,c}\} \quad (6).$$

It should be understood that $P_{Regulatory,c}$ is a newly defined power, and $P_{Regulatory,c}$ is equal to the preset threshold.

It should be further understood that in addition to a case in which the maximum configured transmit power of the target carrier is less than the preset threshold, the formulas (4) to (6) are also applicable to a case in which the maximum configured transmit power of the target carrier is greater than the preset threshold.

It should be further understood that in the formulas (5) and (6), $P_{Regulatory,c}$ may be directly set to the preset threshold, or may be replaced with the following formula:

$$P_{Powerclass} - PCR_c \quad (7),$$

where $PCR_c$ is a preset power reduction value of the carrier, and the preset power reduction value of the carrier is set based on the preset threshold and a value of $P_{PowerClass}$, and corresponds to different values in different scenarios.

$P_{Regulatory,c}$ may alternatively be replaced with the following formula:

$$\text{EIRP\_}P_{Regulatory,c} - G_{Ant} \quad (8),$$

where $\text{EIRP\_}P_{Regulatory,c}$ is a preset equivalent isotropically radiated power value of the carrier, and $G_{Ant}$ is an antenna gain corresponding to the first wireless communications device. It should be understood that the preset equivalent isotropically radiated power value of the carrier is set by a user or the system, and may be specifically set based on a limitation imposed on an equivalent isotropically radiated power of the carrier by coexistence of the first wireless communications device and the second wireless communications device under the first condition, or may be set based on another factor. This is not specifically limited herein. In this case, the preset threshold is equal to the preset equivalent isotropically radiated power value of the carrier minus the antenna gain corresponding to the first wireless communications device.

$P_{Regulatory,c}$ may alternatively be replaced with the following formula:

$$P_{Regulatory,c} = PSD_{Regulatory,c} + 10 \lg BW \quad (9),$$

where $PSD_{Regulatory,c}$ is a preset power spectrum density value of the carrier, and BW is a bandwidth occupied by the target carrier. It should be understood that the preset power spectrum density value of the carrier is set by a user or the system, and may be specifically set based on a limitation imposed on a power spectrum density of the carrier by coexistence of the first wireless communications device and the second wireless communications device under the first condition, or may be set based on another factor. This is not specifically limited herein. In this case, the preset threshold is equal to $PSD_{Regulatory,c} + 10 \lg BW$ $P_{Regulatory,c}$ may alternatively be replaced with the following formula:

$$P_{Regulatory,c} = EIRP\_PSD_{Regulatory,c} - G_{Ant} + 10 \lg BW \quad (10),$$

where $EIRP\_PSD_{Regulatory,c}$ is a preset equivalent isotropically radiated power spectrum density value of the carrier, BW is a bandwidth occupied by the target carrier, and $G_{Ant}$ is an antenna gain corresponding to the first wireless communications device. It should be understood that the preset equivalent isotropically radiated power spectrum density value of the carrier is set by a user or the system, and may be specifically set based on a limitation imposed on an equivalent isotropically radiated power spectrum density of the carrier by coexistence of the first wireless communications device and the second wireless communications device under the first condition, or may be set based on another factor. This is not specifically limited herein.

This embodiment of the present invention provides a plurality of specific manners of adjusting the maximum configured transmit power of the carrier of the first wireless communications device, thereby improving flexibility of the solution.

Mode 3. A plurality of new powers are defined.

In another embodiment of the transmit power determining method provided in this embodiment of the present invention, the maximum transmit power corresponding to the first wireless communications device is the maximum configured transmit power $P_{CMAX,c}$ of the carrier of the first wireless communications device, and the first wireless communications device adjusts the maximum transmit power corresponding to the first wireless communications device in the following manner:

For any carrier corresponding to the first wireless communications device, that is, a target carrier, the first wireless communications device adjusts a maximum configured transmit power $P_{CMAX,c}$ of the target carrier according to the following formulas (11) to (13):

$$P_{CMAX\_L,c} \le P_{CMAX,c} \le P_{CMAX\_H,c}; \quad (11)$$

$$P_{CMAX\_L,c} = \text{MIN} \left\{ P_{EMAX,c} - \Delta T_{C,c}, P_{PwrClass} - \text{MAX}\begin{pmatrix} MPR_c + A - MPR_c + \\ \Delta T_{IB,c} + \Delta T_{C,c} + \Delta T_{ProSe}, \\ P - MPR_c \end{pmatrix}, \right. \\ \left. P_{Regulatory,c}, PSD_{Regulatory,c} + 10 \lg BW \right\} \quad (12)$$

and $$P_{CMAX\_H,c} = \text{MIN}\{P_{EMAX,c}, P_{PowerClass}, P_{Regulatory,c}, \\ PSD_{Regulatory,c} + 10 \lg BW\} \quad (13),$$

where $P_{Regulatory,c}$ is the preset threshold, and may be specifically set based on a limitation imposed on a configured transmit power of the carrier by coexistence of the first wireless communications device and the second wireless communications device under the first condition, and $PSD_{Regulatory,c}$ is a preset power spectrum density value of the carrier, and may be specifically set based on a limitation imposed on a power spectrum density of the carrier by coexistence of the first wireless communications device and the second wireless communications device under the first condition, or may be set based on another factor. This is not specifically limited herein. The first wireless communications device determines the maximum configured transmit power of the target carrier according to the formulas (11) to (13), so that when the first wireless communications device and the second wireless communications device coexist, both the power spectrum density of the carrier and the configured transmit power of the carrier can be limited.

In addition to that both the power spectrum density of the carrier and the configured transmit power of the carrier are limited, both an equivalent isotropically radiated power of the carrier and the configured transmit power of the carrier may be further limited. Specifically, the first wireless communications device adjusts the maximum configured transmit power $P_{CMAX,c}$ of the target carrier according to the following formulas (14) to (16):

$$P_{CMAX\_L,c} \le P_{CMAX,c} \le P_{CMAX\_H,c}; \tag{14}$$

$$P_{CMAX\_L,c} = \text{MIN}\left\{\begin{array}{l} P_{EMAX,c} - \Delta T_{C,c}, P_{PowerClass} - \\ \text{MAX}\left(\begin{array}{l} MPR_c + A - MPR_c + \Delta T_{IB,c} + \\ \Delta T_{C,c} + \Delta T_{ProSe}, P - MPR_c \end{array}\right), \\ P_{Regulatory,c}, \text{EIRP\_P}_{Regulatory,c} - G_{Ant} \end{array}\right\}; \tag{15}$$

and $$P_{CMAX\_H,c} = \text{MIN}\{P_{EMAX,c}, P_{PowerClass}, P_{Regulatory,c}, \\ \text{EIRP\_P}_{Regulatory,c} - G_{Ant}\} \tag{16},$$

where $P_{Regulatory,c}$ is the preset threshold, and $\text{EIRP\_P}_{Regulatory,c}$ is a preset equivalent isotropically radiated power value of the carrier.

Alternatively, both the equivalent isotropically radiated power of the carrier and the power spectrum density of the carrier may be limited. Specifically, the first wireless communications device adjusts the maximum configured transmit power $P_{CMAX,c}$ of the target carrier according to the following formulas (17) to (19):

$$P_{CMAX\_L,c} \le P_{CMAX,c} \le P_{CMAX\_H,c}; \tag{17}$$

$$P_{CMAX\_L,c} = \tag{18}$$

$$\text{MIN}\left\{\begin{array}{l} P_{EMAX,c} - \Delta T_{C,c}, P_{PowerClass} - \\ \text{MAX}\left(\begin{array}{l} MPR_c + A - MPR_c + \Delta T_{IB,c} + \\ \Delta T_{C,c} + \Delta T_{ProSe}, P - MPR_c \end{array}\right), \\ \text{EIRP\_P}_{Regulatory,c} - G_{Ant}, PSD_{Regulatory,c} + 10\, lg\, BW \end{array}\right\}; \text{and}$$

$$P_{CMAX\_H,c} = \text{MIN}\left\{\begin{array}{l} P_{EMAX,c}, P_{PowerClass}, \text{EIRP\_P}_{Regulatory,c} - G_{Ant}, \\ PSD_{Regulatory,c} + 10\, lg\, BW \end{array}\right\}, \tag{19}$$

where $PSD_{Regulatory,c}$ is a preset power spectrum density value of the carrier, $\text{EIRP\_P}_{Regulatory,c}$ is a preset equivalent isotropically radiated power value of the carrier, and in this case, the preset threshold is a smaller value in $PSD_{Regulatory,c}+10\,lgBW$ and $\text{EIRP\_P}_{Regulatory,c}-G_{Ant}$.

Alternatively, the following three parameters may all be limited: the equivalent isotropically radiated power of the carrier, the configured transmit power of the carrier, and the power spectrum density of the carrier. Specifically, the first wireless communications device adjusts the maximum configured transmit power $P_{CMAX,c}$ of the target carrier according to the following formulas (20) to (22):

$$P_{CMAX\_L,c} \le P_{CMAX,c} \le P_{CMAX\_H,c}; \tag{20}$$

$$P_{CMAX\_L,c} = \text{MIN}\left\{\begin{array}{l} P_{EMAX,c} - \Delta T_{C,c}, P_{PowerClass} - \\ \text{MAX}\left(\begin{array}{l} MPR_c + A - MPR_c + \Delta T_{IB,c} + \\ \Delta T_{C,c} + \Delta T_{ProSe}, P - MPR_c \end{array}\right), \\ P_{Regulatory,c}, \text{EIRP\_P}_{Regulatory,c} - G_{Ant}, \\ PSD_{Regulatory,c} + 10\, lg\, BW \end{array}\right\}; \text{and} \tag{21}$$

-continued $$P_{CMAX\_H,c} = \text{MIN}\left\{\begin{array}{l} P_{EMAX,c}, P_{PowerClass}, P_{Regulatory,c}, \\ \text{EIRP\_P}_{Regulatory,c} - G_{Ant}, \\ PSD_{Regulatory,c} + 10\, lg\, BW \end{array}\right\}, \tag{22}$$

where $\text{EIRP\_P}_{Regulatory,c}$ is a preset equivalent isotropically radiated power value of the carrier, $PSD_{Regulatory,c}$ is a preset power spectrum density value of the carrier, and $P_{Regulatory,c}$ is the preset threshold.

It should be understood that in addition to the several cases listed above, in this application, alternatively, two or more of the following four parameters may be limited: the configured transmit power of the carrier, the power spectrum density of the carrier, the equivalent isotropically radiated power of the carrier, and equivalent isotropically radiated power spectrum density of the carrier, and corresponding formulas are not listed herein again. It should be further understood that in addition to a case in which the maximum configured transmit power of the target carrier is less than the preset threshold, the formulas (11) to (13), (14) to (16), (17) to (19), and (20) to (22) are also applicable to a case in which the maximum configured transmit power of the target carrier is greater than the preset threshold.

In this embodiment of the present invention, a plurality of new powers are defined, so that when the first wireless communications device and the second wireless communications device coexist, a plurality of parameters of the carrier of the first wireless communications device can be limited.

Case 2. The maximum transmit power corresponding to the first wireless communications device is the maximum configured transmit power of the device.

Mode 1. A value of $P_{EMAX,c}$ is adjusted at an RRC layer.

In another embodiment of the transmit power determining method provided in this embodiment of the present invention, the maximum transmit power corresponding to the first wireless communications device is the maximum configured transmit power $P_{CMAX}$ of the first wireless communications device, and the first wireless communications device adjusts the maximum configured transmit power $P_{CMAX}$ of the first wireless communications device according to the following formulas (23) to (25):

$$P_{CMAX\_L} \le P_{CMAX} \le P_{CMAX\_H}; \tag{23}$$

$$P_{CMAX\_L} = \text{MIN}\left\{\begin{array}{l} 10\log_{10}\sum p_{EMAX,c} - \Delta T_C, P_{PowerClass} - \\ \text{MAX}\left(\begin{array}{l} MPR + A - MPR + \Delta T_{IB,c} + \\ \Delta T_C + \Delta T_{ProSe}, P - MPR \end{array}\right) \end{array}\right\}; \tag{24}$$

and $$P_{CMAX\_H} = \text{MIN}\{10\log_{10} \Sigma p_{EMAX,c}, P_{PowerClass}\} \tag{25}.$$

It should be understood that $\Sigma p_{EMAX,c}$ is a sum of power values delivered by the system, in signaling of the RRC layer, for all carriers corresponding to first wireless communication, and a power value of each carrier is usually set at the RRC layer based on a setting of an operator or another reason. In this embodiment of the present invention, at the RRC layer, a value of $10 \log_{10} \Sigma p_{EMAX,c}$ is calculated based on the power value of each carrier that is set based on the operator or another reason, and the value is compared with the preset threshold. When the value is greater than the preset threshold, the power value of each carrier is adjusted at the RRC layer, so that the power value of each carrier is delivered by using signaling after $10 \log_{10} \Sigma p_{EMAX,c}$ is equal to the preset threshold. In this case, the first wireless communications device determines the maximum configured transmit power of the first wireless communications device according to the formulas (23) to (25), so that the maximum configured transmit power of the first wireless communications device is less than or equal to the preset threshold.

This embodiment of the present invention provides a specific manner of adjusting the maximum configured transmit power of the first wireless communications device, thereby improving implementability of the solution.

Mode 2. A new power is defined.

In another embodiment of the transmit power determining method provided in this embodiment of the present invention, the maximum transmit power corresponding to the first wireless communications device is the maximum configured transmit power $P_{CMAX}$ of the first wireless communications device, and the first wireless communications device adjusts the maximum configured transmit power $P_{CMAX}$ of the first wireless communications device according to the following formulas (26) to (28):

$$P_{CMAX\_L} \le P_{CMAX} \le P_{CMAX\_H}; \quad (26)$$

$$P_{CMAX\_L} = \text{MIN}\left\{\begin{array}{l} 10\log_{10}\sum p_{EMAX,c} - \Delta T_C, P_{PowerClass} - \\ \text{MAX}\left(\begin{array}{l} MPR + A - MPR + \Delta T_{IB,c} + \\ \Delta T_C + \Delta T_{ProSe}, P - MPR \end{array}\right), \\ P_{Regulatory} \end{array}\right\}; \quad (27)$$

and $$P_{CMAX\_H} = \text{MIN}\{10 \log_{10} \Sigma p_{EMAX,c}, P_{PowerClass}, P_{Regulatory}\} \quad (28).$$

It should be understood that $P_{Regulatory}$ is a newly defined power, and $P_{Regulatory}$ is equal to the preset threshold.

It should be further understood that in addition to a case in which the maximum configured transmit power of the first wireless communications device is less than the preset threshold, the formulas (26) and (27) are also applicable to a case in which the maximum configured transmit power of the first wireless communications device is greater than the preset threshold.

It should be further understood that in the formulas (27) and (28), $P_{Regulatory}$ may be directly set to the preset threshold, or may be replaced with the following formula:

$$P_{Regulatory} = P_{PowerClass} - PCR \quad (29),$$

where

PCR is a preset power reduction value of the device, and the preset power reduction value of the device is set based on the preset threshold and a value of $P_{PowerClass}$, and corresponds to different values in different scenarios.

$P_{Regulatory}$ may alternatively be replaced with the following formula:

$$P_{Regulatory} = EIRP\_P_{Regulatory} - G_{Ant} \quad (30),$$

where

EIRP_Regulatory is a preset equivalent isotropically radiated power value of the device, and $G_{Ant}$ is an antenna gain corresponding to the first wireless communications device. It should be understood that the preset equivalent isotropically radiated power value of the device is set by a user or the system, and may be specifically set based on a limitation imposed on an equivalent isotropically radiated power of the first wireless communications device by coexistence of the first wireless communications device and the second wireless communications device under the first condition, or may be set based on another factor. This is not specifically limited herein. In this case, the preset threshold is equal to the preset equivalent isotropically radiated power value of the device minus the antenna gain corresponding to the first wireless communications device.

$P_{Regulatory}$ may alternatively be replaced with the following formula:

$$P_{Regulatory} = PSD_{Regulatory} + 10 \lg BW \quad (31),$$

where $PSD_{Regulatory}$ is a preset power spectrum density value of the device, and BW is a bandwidth occupied by the first wireless communications device. It should be understood that the preset power spectrum density value of the device is set by a user or the system, and may be specifically set based on a limitation imposed on a power spectrum density of the first wireless communications device by coexistence of the first wireless communications device and the second wireless communications device under the first condition, or may be set based on another factor. This is not specifically limited herein. In this case, the preset threshold is equal to $PSD_{Regulatory} + 10 \lg BW$ $P_{Regulatory}$ may alternatively be replaced with the following formula:

$$P_{Regulatory} = EIRP\_PSD_{Regulatory} - G_{Ant} + 10 \lg BW \quad (32),$$

where $EIRP\_PSD_{Regulatory}$ is a preset equivalent isotropically radiated power spectrum density value of the device, BW is a bandwidth occupied by the first wireless communications device, and $G_{Ant}$ is an antenna gain corresponding to the first wireless communications device. It should be understood that the preset equivalent isotropically radiated power spectrum density value of the device is set by a user or the system, and may be specifically set based on a limitation imposed on an equivalent isotropically radiated power spectrum density of the device by coexistence of the first wireless communications device and the second wireless communications device under the first condition, or may be set based on another factor. This is not specifically limited herein. This embodiment of the present invention provides a plurality of specific manners of adjusting the maximum configured transmit power of the first wireless communications device, thereby improving flexibility of the solution.

Mode 3. A plurality of new powers are defined.

In another embodiment of the transmit power determining method provided in this embodiment of the present invention, the maximum transmit power corresponding to the first wireless communications device is the maximum configured transmit power $P_{CMAX}$ of the first wireless communications device, and the first wireless communications device adjusts the maximum configured transmit power $P_{CMAX}$ of the first wireless communications device according to the following formulas (33) to (35):

$$P_{CMAX\_L} \le P_{CMAX} \le P_{CMAX\_H}; \quad (33)$$

$$P_{CMAX\_L} = \text{MIN}\left\{\begin{array}{l} 10\log_{10}\sum p_{EMAX,c} - \Delta T_C, P_{PowerClass} - \\ \text{MAX}\left(\begin{array}{l} MPR + A - MPR + \Delta T_{IB,c} + \\ \Delta T_C + \Delta T_{ProSe}, P - MPR \end{array}\right), \\ P_{Regulatory}, PSD_{Regulatory} + 10 \lg BW \end{array}\right\}; \quad (34)$$

and $$P_{CMAX\_H} = \text{MIN}\{10 \log_{10} \Sigma p_{EMAX,c}, P_{PowerClass}, P_{Regulatory}, PSD_{Regulatory} + 101 \text{ g } BW\} \quad (35),$$

where $P_{Regulatory}$ is the preset threshold, and may be specifically set based on a limitation imposed on a configured transmit power of the first wireless communications device by coexistence of the first wireless communications device and the second wireless communications device under the first condition, and $PSD_{Regulatory}$ is a preset power spectrum density value of the device, and may be specifically set based on a limitation imposed on a power spectrum density of the device by coexistence of the first wireless communications device and the second wireless communications device under the first condition, or may be set based on another factor. This is not specifically limited herein. The first wireless communications device determines the maximum configured transmit power of the first wireless communications device according to the formulas (33) to (35), so that when the first wireless communications device and the second wireless communications device coexist, the power spectrum density of the first wireless communications device and the configured transmit power of the first wireless communications device can be limited.

In addition to that both the power spectrum density of the first wireless communications device and the configured transmit power of the first wireless communications device are limited, both an equivalent isotropically radiated power of the first wireless communications device and the configured transmit power of the first wireless communications device may be further limited. Specifically, the first wireless communications device adjusts the maximum configured transmit power $P_{CMAX}$ of the first wireless communications device according to the following formulas (36) to (38):

$$P_{CMAX\_L} \leq P_{CMAX} \leq P_{CMAX\_H}; \quad (36)$$

$$P_{CMAX\_L} = \text{MIN}\left\{ \begin{array}{l} 10\log_{10}\sum p_{EMAX,c} - \Delta T_C, P_{PowerClass} - \\ \text{MAX}\left( \begin{array}{l} MPR + A - MPR + \Delta T_{IB,c} + \\ \Delta T_C + \Delta T_{ProSe}, P - MPR \end{array} \right), \\ P_{Regulatory}, \text{EIRP\_P}_{Regulatory} - G_{Ant} \end{array} \right\}; \quad (37)$$

and $$P_{CMAX\_H} = \text{MIN}\{10 \log_{10} \Sigma p_{EMAX,c}, P_{PowerClass}, P_{Regulatory}, \text{EIRP\_P}_{Regulatory} - G_{Ant}\} \quad (38),$$

where $P_{Regulatory,c}$ is the preset threshold, and $\text{EIRP\_P}_{Regulatory}$ is a preset equivalent isotropically radiated power value of the device.

Alternatively, both the equivalent isotropically radiated power of the first wireless communications device and the power spectrum density of the first wireless communications device may be limited. Specifically, the first wireless communications device adjusts the maximum configured transmit power $P_{CMAX}$ of the first wireless communications device according to the following formulas (39) to (41):

$$P_{CMAX\_L} \leq P_{CMAX} \leq P_{CMAX\_H}; \quad (39)$$

$$P_{CMAX\_L} = \text{MIN}\left\{ \begin{array}{l} 10\log_{10}\sum p_{EMAX,c} - \Delta T_C, P_{PowerClass} - \\ \text{MAX}\left( \begin{array}{l} MPR + A - MPR + \Delta T_{IB,c} + \\ \Delta T_C + \Delta T_{ProSe}, P - MPR \end{array} \right), \\ \text{EIRP\_P}_{Regulatory} - G_{Ant}, PSD_{Regulatory} + 10 \lg BW \end{array} \right\}; \quad (40)$$

and $$P_{CMAX\_H} = \text{MIN}\{10 \log_{10} \Sigma p_{EMAX,c}, P_{PowerClass}, \text{EIRP\_P}_{Regulatory} - G_{Ant}, PSD_{Regulatory} + 101 \text{ g } BW\} \quad (41),$$

where $PSD_{Regulatory}$ is a preset power spectrum density value of the device, $\text{EIRP\_P}_{Regulatory}$ is a preset equivalent isotropically radiated power value of the device, and in this case, the preset threshold is a smaller value in $PSD_{Regulatory} + 101$ gBW and $\text{EIRP\_P}_{Regulatory} - G_{Ant}$.

Alternatively, the following three parameters may all be limited: the equivalent isotropically radiated power of the first wireless communications device, the configured transmit power of the first wireless communications device, and the power spectrum density of the first wireless communications device. Specifically, the first wireless communications device adjusts the maximum configured transmit power $P_{CMAX}$ of the device according to the following formulas (42) to (44):

$$P_{CMAX\_L} \leq P_{CMAX} \leq P_{CMAX\_H}; \quad (42)$$

$$P_{CMAX\_L} = \text{MIN}\left\{ \begin{array}{l} 10\log_{10}\sum p_{EMAX,c} - \Delta T_C, P_{PowerClass} - \\ \text{MAX}\left( \begin{array}{l} MPR + A - MPR + \Delta T_{IB,c} + \\ \Delta T_C + \Delta T_{ProSe}, P - MPR \end{array} \right), \\ P_{Regulatory}, \text{EIRP\_P}_{Regulatory} - G_{Ant}, \\ PSD_{Regulatory} + 10 \lg BW \end{array} \right\}; \quad (43)$$

and $$P_{CMAX\_H} = \text{MIN}\{10 \log_{10} \Sigma p_{EMAX,c}, P_{Powerclass}, P_{Regulatory}, \text{EIRP\_P}_{Regulatory} - G_{Ant}, PSD_{Regulatory} + 101 \text{ g } BW\} \quad (44),$$

where $PSD_{Regulatory}$ is a preset power spectrum density value of the device, $\text{EIRP\_P}_{Regulatory}$ is a preset equivalent isotropically radiated power value of the device, and $P_{Regulatory}$ is the preset threshold.

It should be understood that in addition to the several cases listed above, in this application, two or more of the following four parameters may be limited: the configured transmit power of the device, the power spectrum density of the device, the equivalent isotropically radiated power of the device, and equivalent isotropically radiated power spectrum density of the device, and corresponding formulas are not listed herein again.

It should be further understood that in addition to a case in which the maximum configured transmit power of the first wireless communications device is less than the preset threshold, the formulas (33) to (35), (36) to (38), (39) to (41), and (42) to (44) are also applicable to a case in which the maximum configured transmit power of the first wireless communications device is greater than the preset threshold.

In this embodiment of the present invention, a plurality of new powers are defined, so that when the first wireless communications device and the second wireless communications device coexist, a plurality of parameters of the first wireless communications device can be limited.

Figure 2:
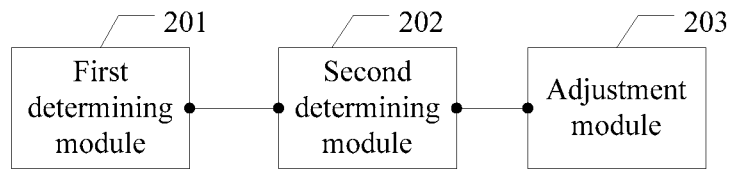
FIG. 2 is a schematic diagram of a wireless communications device according to an embodiment of the present invention.

The foregoing describes the transmit power determining method in the embodiments of the present invention, and the following describes the wireless communications device in the embodiments of the present invention. Referring to FIG. 2, a wireless communications device according to an embodiment of the present invention may include:

a first determining module 201 configured to determine a distance between the wireless communications device and a second wireless communications device;

a second determining module 202 configured to determine a working frequency of the second wireless communications device; and an adjustment module 203 configured to: when it is determined that a first condition is met and that a maximum transmit power corresponding to the wireless communications device is greater than a preset threshold, adjust the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance between the wireless communications device and a second wireless communications device is less than or equal to a first threshold, and a difference between a working frequency of the wireless communications device and the working frequency of the second wireless communications device is less than or equal to a second threshold.

In this embodiment of the present invention, when the wireless communications device determines that the first condition is met, if the maximum transmit power corresponding to the wireless communications device is greater than the preset threshold, the adjustment module 203 adjusts the maximum transmit power corresponding to the first wireless communications device, so that the adjusted maximum transmit power is less than or equal to the preset threshold, where the first condition includes that the distance between the first wireless communications device and the second wireless communications device is less than or equal to the first threshold, and the difference between the working frequency of the first wireless communications device and the working frequency of the second wireless communications device is less than or equal to the second threshold. Therefore, the preset threshold is set, so that the interference caused by the first wireless communications device to the receiving performance of the second wireless communications device can be suppressed, and a requirement of coexistence of the first wireless communications device and the second wireless communications device under the first condition can be met. In other words, according to the solution, interference between devices can be suppressed, and a requirement of coexistence of a plurality of devices can be met.

Based on the embodiment corresponding to FIG. 2, the maximum transmit power corresponding to the wireless communications device may be a maximum configured transmit power of a carrier of the wireless communications device, may be a maximum configured transmit power of the wireless communications device, or may be a maximum transmit power that corresponds to the wireless communications device and that is set based on another reason. The following separately describes a case in which the maximum transmit power corresponding to the wireless communications device is the maximum configured transmit power of the carrier and a case in which the maximum transmit power corresponding to the wireless communications device is the maximum configured transmit power of the device.

Case 1. The maximum transmit power corresponding to the wireless communications device is the maximum configured transmit power $P_{EMAX,c}$ of the carrier.

Figure 3:
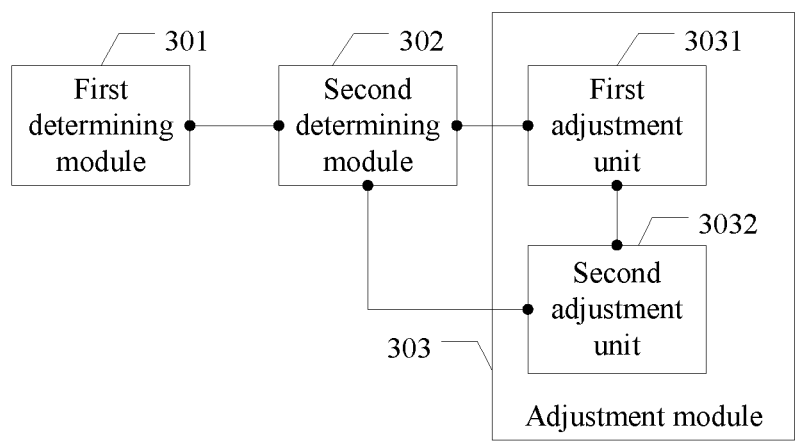
FIG. 3 is a schematic diagram of a wireless communications device according to another embodiment of the present invention.

Referring to FIG. 3, a wireless communications device according to another embodiment of the present invention may include:

a first determining module 301 configured to determine a distance between the wireless communications device and a second wireless communications device;

a second determining module 302 configured to determine a working frequency of the second wireless communications device; and an adjustment module 303 configured to: when it is determined that a first condition is met and that a maximum transmit power corresponding to the wireless communications device is greater than a preset threshold, adjust the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance between the wireless communications device and a second wireless communications device is less than or equal to a first threshold, and a difference between a working frequency of the wireless communications device and the working frequency of the second wireless communications device is less than or equal to a second threshold.

It should be understood that in this embodiment of the present invention, the maximum transmit power corresponding to the wireless communications device includes a maximum configured transmit power of a carrier of the wireless communications device. In addition, in this embodiment of the present invention, the first condition may further include that an angle difference between an antenna direction of the wireless communications device and an antenna direction of the second wireless communications device is less than or equal to a third threshold, or may include another condition. This is not specifically limited in this embodiment of the present invention.

It should be further understood that in this embodiment of the present invention, the adjustment module 303 may include:

a first adjustment unit 3031, configured to adjust a maximum configured transmit power $P_{CMAX,c}$ of a target carrier of the wireless communications device according to the foregoing formulas (1) to (3); or a second adjustment unit 3032, configured to adjust a maximum configured transmit power $P_{CMAX,c}$ of a target carrier of the wireless communications device according to the foregoing formulas (4) to (6).

Specifically, $P_{Regulatory,c}$ in the foregoing formulas (5) and (6) may alternatively be replaced with the foregoing formulas (7), (8), (9), or (10).

In this embodiment of the present invention, when the wireless communications device determines that the first condition is met, if the maximum transmit power corresponding to the wireless communications device is greater than the preset threshold, the adjustment module 303 adjusts the maximum transmit power corresponding to the first wireless communications device, so that the adjusted maximum transmit power is less than or equal to the preset threshold, where the first condition includes that the distance between the first wireless communications device and the second wireless communications device is less than or equal to the first threshold, and the difference between the working frequency of the first wireless communications device and the working frequency of the second wireless communications device is less than or equal to the second threshold. Therefore, the preset threshold is set, so that the interference caused by the first wireless communications device to the receiving performance of the second wireless communications device can be suppressed, and a requirement of coexistence of the first wireless communications device and the second wireless communications device under the first condition can be met. In other words, according to the solution, interference between devices can be suppressed, and a requirement of coexistence of a plurality of devices can be met.

In addition, in this embodiment of the present invention, the maximum transmit power corresponding to the wireless communications device includes the maximum configured transmit power of the carrier, and this embodiment of the present invention provides a plurality of manners of adjusting the maximum configured transmit power of the carrier, thereby improving flexibility of the solution.

Case 2. The maximum transmit power corresponding to the wireless communications device is the maximum configured transmit power $P_{CMAX}$ of the device.

Figure 4:
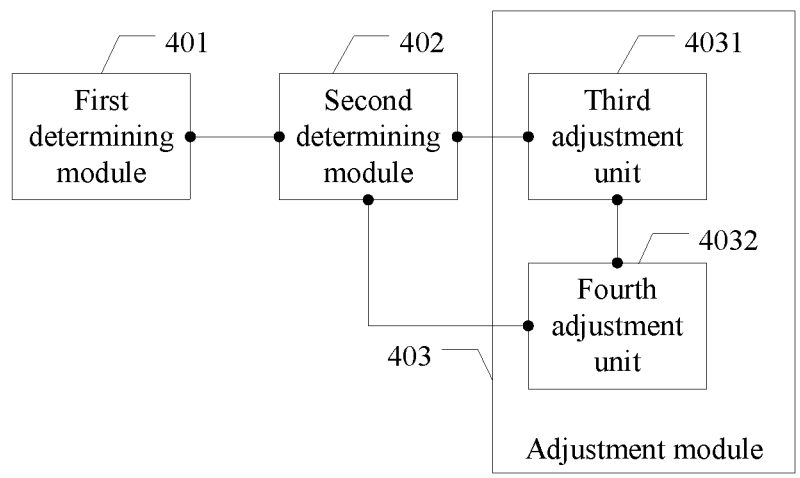
FIG. 4 is a schematic diagram of a wireless communications device according to yet another embodiment of the present invention.

Referring to FIG. 4, a wireless communications device according to an embodiment of the present invention includes:

a first determining module 401 configured to determine a distance between the wireless communications device and a second wireless communications device;

a second determining module 402 configured to determine a working frequency of the second wireless communications device; and an adjustment module 403 configured to: when it is determined that a first condition is met and that a maximum transmit power corresponding to the wireless communications device is greater than a preset threshold, adjust the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance between the wireless communications device and a second wireless communications device is less than or equal to a first threshold, and a difference between a working frequency of the wireless communications device and the working frequency of the second wireless communications device is less than or equal to a second threshold.

It should be understood that in this embodiment of the present invention, the maximum transmit power corresponding to the wireless communications device includes a maximum configured transmit power of the wireless communications device. In addition, in this embodiment of the present invention, the first condition may further include that an angle difference between an antenna direction of the wireless communications device and an antenna direction of the second wireless communications device is less than or equal to a third threshold, or may include another condition. This is not specifically limited in this embodiment of the present invention.

It should be further understood that in this embodiment of the present invention, the adjustment module 403 may include:

a third adjustment unit 4031, configured to adjust the maximum configured transmit power $P_{CMAX}$ of the wireless communications device according to the foregoing formulas (23) to (25); or a fourth adjustment unit 4032, configured to adjust the maximum configured transmit power $P_{CMAX}$ of the wireless communications device according to the foregoing formulas (26) to (28).

Specifically, $P_{Regulatory}$ in the foregoing formulas (27) and (28) is replaced with the foregoing formulas (29), (30), (31), or (32).

In this embodiment of the present invention, when the wireless communications device determines that the first condition is met, if the maximum transmit power corresponding to the wireless communications device is greater than the preset threshold, the adjustment module 403 adjusts the maximum transmit power corresponding to the first wireless communications device, so that the adjusted maximum transmit power is less than or equal to the preset threshold, where the first condition includes that the distance between the first wireless communications device and the second wireless communications device is less than or equal to the first threshold, and the difference between the working frequency of the first wireless communications device and the working frequency of the second wireless communications device is less than or equal to the second threshold. Therefore, the preset threshold is set, so that the interference caused by the first wireless communications device to the receiving performance of the second wireless communications device can be suppressed, and a requirement of coexistence of the first wireless communications device and the second wireless communications device under the first condition can be met. In other words, according to the solution, interference between devices can be suppressed, and a requirement of coexistence of a plurality of devices can be met.

In addition, in this embodiment of the present invention, the maximum transmit power corresponding to the wireless communications device includes the maximum configured transmit power of the device, and this embodiment of the present invention provides a plurality of manners of adjusting the maximum configured transmit power of the wireless communications device, thereby improving flexibility of the solution.

Figure 5:
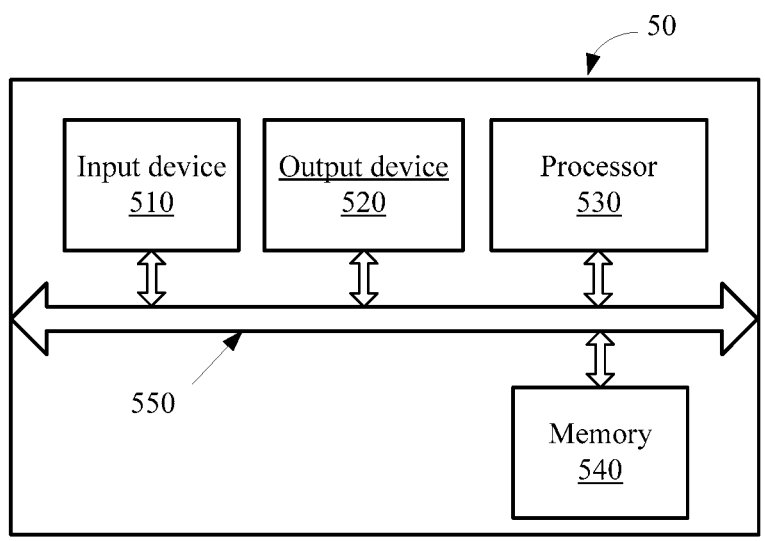
FIG. 5 is a schematic diagram of a wireless communications device according to some embodiments of the present invention.

The foregoing describes the wireless communications device in the embodiments of the present invention from the perspective of modularization, and the following describes the wireless communications device in the embodiments of the present invention from the perspective of entity hardware. FIG. 5 is a schematic structural diagram of a wireless communications device 50 according to an embodiment of the present invention. The wireless communications device 50 may include an input device 510, an output device 520, a processor 530, and a memory 540.

The memory 540 may include a read-only memory and a random access memory, and provide instruction codes and data for the processor 530. The memory 540 may further include a nonvolatile random access memory (Nonvolatile Random Access Memory, NVRAM).

The memory 540 stores the following elements, an executable module, or a data structure, or a subset thereof, or an extended set thereof:

an operation instruction set, including various operation instructions, and used to implement various operations; and an operating system, including various systems, programs, and hardware used to implement various basic services and process hardware-based tasks.

In this embodiment of the present invention, the processor 530 is configured to:

determine a distance between the wireless communications device and a second wireless communications device;

determine a working frequency of the second wireless communications device; and when the wireless communications device determines that a first condition is met, if the wireless communications device determines that a maximum transmit power corresponding to the wireless communications device is greater than a preset threshold, adjust the maximum transmit power, so that the adjusted maximum transmit power is equal to or less than the preset threshold, where the preset threshold is used to suppress, under the first condition, interference caused by the wireless communications device to receiving performance of the second wireless communications device, where the first condition includes that the distance is less than or equal to a first threshold, and a difference between a working frequency of the wireless communications device and the working frequency of the second wireless communications device is less than or equal to a second threshold.

The processor 530 controls an operation of the wireless communications device 50, and the processor 530 may alternatively be referred to as a central processing unit (Central Processing Unit, CPU). The memory 540 may include a read-only memory and a random access memory, and provide an instruction and data for the processor 530. A part of the memory 540 may further include an NVRAM. In specific application, various components of the wireless communications device 50 are coupled through a bus system 550. In addition to a data bus, the bus system 550 may further include a power bus, a control bus, a status signal bus, and the like. However, for clear description, various types of buses in the figure are marked as the bus system 550.

The method disclosed in the embodiments of the present invention may be applied to the processor 530, or implemented by the processor 530. The processor 530 may be an integrated circuit chip and has a signal processing capability. In an implementation process, steps in the foregoing methods can be implemented by using a hardware integrated logic circuit in the processor 530, or by using instructions in a form of software. The processor 530 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art such as a random access memory, a flash memory, a read-only memory, a programmable read-only memory, an electrically erasable programmable memory, or a register. The storage medium is located in the memory 540, and the processor 530 reads information in the memory 540 and completes the steps in the foregoing methods in combination with hardware of the processor.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A transmit power determining method, comprising:
   determining, by a first wireless communications device, a distance between the first wireless communications device and a second wireless communications device;
   determining, by the first wireless communications device, a working frequency of the second wireless communications device; and
   when the first wireless communications device determines that a first condition is met, if the first wireless communications device determines that a maximum transmit power corresponding to the first wireless communications device is greater than a preset threshold, adjusting the maximum transmit power, the adjusted maximum transmit power being equal to or less than the preset threshold, wherein the preset threshold is used to suppress interference caused by the first wireless communications device to receiving performance of the second wireless communications device under the first condition, wherein
   the first condition specifies that the distance is less than or equal to a first threshold, and a difference between a working frequency of the first wireless communications device and the working frequency of the second wireless communications device is less than or equal to a second threshold.

2. The method according to claim 1, wherein the maximum transmit power corresponding to the first wireless communications device comprises a maximum configured transmit power $P_{CMAX,c}$ of a carrier of the first wireless communications device.

3. The method according to claim 2, wherein adjusting the maximum transmit power comprises:
   adjusting, by the first wireless communications device, a maximum configured transmit power $P_{CMAX,c}$ of a target carrier of the first wireless communications device according to the following formulas:

$$P_{CMAX\_L,c} \leq P_{CMAX,c} \leq P_{CMAX\_H,c};$$

$$P_{CMAX\_L,c} = \text{MIN}\left\{\begin{array}{c} P_{EMAX,c} - \Delta T_{C,c}, P_{PowerClass} - \\ \text{MAX}\left(\begin{array}{c} MPR_c + A - MPR_c + \Delta T_{IB,c} + \\ \Delta T_{C,c} + \Delta T_{ProSe}, P - MPR_c \end{array}\right) \end{array}\right\};$$

and $$P_{CMAX\_H,c} = \text{MIN}\{P_{EMAX,c}, P_{PowerClass}\},$$

wherein
$P_{EMAX,c}$ is a power value delivered at a radio resource control (RRC) layer for the target carrier, $P_{EMAX,c}$ is equal to the preset threshold, $\Delta T_{C,c}$ is a first power loss value, $P_{PowerClass}$ is a power class of the first wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, and $P\text{-}MPR_c$ is a third power reduction value.

4. The method according to claim 2, wherein adjusting the maximum transmit power comprises:
   adjusting, by the first wireless communications device, a maximum configured transmit power $P_{EMAX,c}$ of a target carrier of the first wireless communications device according to the following formulas:

$$P_{CMAX\_L,c} \leq P_{CMAX,c} \leq P_{CMAX\_H,c};$$

$$P_{CMAX\_L,c} = \text{MIN}\left\{\begin{array}{c} P_{EMAX,c} - \Delta T_{C,c}, P_{PowerClass} - \\ \text{MAX}\left(\begin{array}{c} MPR_c + A - MPR_c + \Delta T_{IB,c} + \\ \Delta T_{C,c} + \Delta T_{ProSe}, P - MPR_c \end{array}\right), \\ P_{Regulatory,c} \end{array}\right\};$$

and $$P_{CMAX\_H,c} = \text{MIN}\{P_{EMAX,c}, P_{PowerClass}, P_{Regulatory,c}\},$$

wherein
$P_{EMAX,c}$ is a power value delivered at a radio resource control (RRC) layer for the target carrier, $\Delta T_{C,c}$ is a first power loss value, $P_{PowerClass}$ is a power class of the first wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, and $P_{Regulatory,c}$ is equal to the preset threshold.

5. The method according to claim 4, wherein $$P_{Regulatory,c} = P_{PowerClass} - PCR_c,$$

wherein
$PCR_c$ is a preset power reduction value of the carrier.

6. The method according to claim 4, wherein $$P_{Regulatory,c} = EIRP\_P_{Regulatory,c} - G_{Ant},$$

wherein
$EIRP\_P_{Regulatory,c}$ is a preset equivalent isotropically radiated power value of the carrier, and $G_{Ant}$ is an antenna gain of the first wireless communications device.

7. The method according to claim 4, wherein $$P_{Regulatory,c} = PSD_{Regulatory,c} + 10 \lg BW,$$

wherein
$PSD_{Regulatory,c}$ is a preset power spectrum density value of the carrier, and BW is a bandwidth occupied by the target carrier.

8. The method according to claim 1, wherein the maximum transmit power corresponding to the first wireless communications device comprises a maximum configured transmit power $P_{CMAX}$ of the first wireless communications device.

9. The method according to claim 8, wherein the adjusting, by the first wireless communications device, the maximum transmit power comprises:
   adjusting, by the first wireless communications device, the maximum configured transmit power $P_{CMAX}$ of the first wireless communications device according to the following formulas:

$$P_{CMAX\_L} \leq P_{CMAX} \leq P_{CMAX\_H};$$

$$P_{CMAX\_L} = \text{MIN}\left\{\begin{array}{c} 10\log_{10}\sum P_{EMAX,c} - \Delta T_C, P_{PowerClass} - \\ \text{MAX}\left(\begin{array}{c} MPR_c + A - MPR_c + \Delta T_{IB,c} + \\ \Delta T_C + \Delta T_{ProSe}, P - MPR \end{array}\right) \end{array}\right\};$$

and $$P_{CMAX\_H} = \text{MIN}\{10\log_{10}\Sigma p_{EMAX,c}, P_{PowerClass}\},$$

wherein
$P_{EMAX,c}$ is a power value delivered at a radio resource control (RRC) layer for a carrier corresponding to the first wireless communications device 10 $\log_{10} \Sigma p_{EMAX,c}$, is equal to the preset threshold, $\Delta T_c$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, and P-MPR is a sixth power reduction value.

10. The method according to claim 8, wherein adjusting the maximum transmit power comprises:
adjusting, by the first wireless communications device, the maximum configured transmit power $P_{CMAX}$ of the first wireless communications device according to the following formulas:

$$P_{CMAX\_L} \le P_{CMAX} \le P_{CMAX\_H};$$

$$P_{CMAX\_L} = \text{MIN} \left\{ \begin{array}{l} 10 \log_{10} \sum p_{EMAX,c} - \Delta T_C, P_{PowerClass} - \\ \text{MAX}\left( \begin{array}{l} MPR + A - MPR + \Delta T_{IB,c} + \\ \Delta T_C + \Delta T_{ProSe}, P - MPR \end{array} \right), \\ P_{Regulatory} \end{array} \right\};$$

and $$P_{CMAX\_H} = \text{MIN}\{10 \log_{10} \Sigma p_{EMAX,c}, P_{PowerClass}, P_{Regulatory}\},$$

wherein
$P_{EMAX,c}$ is a power value delivered at a radio resource control (RRC) layer for a carrier corresponding to the first wireless communications device, $\Delta T_C$ is a fourth power loss value, $P_{PowerClass}$ is a power class of the first wireless communications device, MPR is a fourth power reduction value, A-MPR is a fifth power reduction value, $\Delta T_{IB,c}$ is a second power loss value, $\Delta T_{ProSe}$ is a third power loss value, P-MPR is a sixth power reduction value, and $P_{Regulatory}$ is equal to the preset threshold.

11. The method according to claim 10, wherein $$P_{Regulatory} = P_{PowerClass} - PCR,$$

wherein
PCR is a preset power reduction value of the device.

12. The method according to claim 10, wherein $$P_{Regulatory} = EIRP\_P_{Regulatory} - G_{Ant},$$

wherein
$EIRP\_P_{Regulatory}$ is a preset equivalent isotropically radiated power value of the device, and $G_{Ant}$ is an antenna gain of the first wireless communications device.

13. The method according to claim 10, wherein $$P_{Regulatory} = PSD_{Regulatory} + 101 \text{ g } BW,$$

wherein
$PSD_{Regulatory}$ is a preset power spectrum density value of the device, and BW is a bandwidth occupied by the first wireless communications device.

14. The method according to claim 1, wherein the first condition further comprises an angle difference between an antenna direction of the first wireless communications device and an antenna direction of the second wireless communications device, the angle difference being less than or equal to a third threshold.

15. A wireless communications device, comprising:
a first determining module configured to determine a distance between the wireless communications device and a second wireless communications device;
a second determining module configured to determine a working frequency of the second wireless communications device; and
an adjustment module configured to: when the wireless communications device determines that a first condition is met and that a maximum transmit power corresponding to the wireless communications device is greater than a preset threshold, adjust the maximum transmit power, the adjusted maximum transmit power being equal to or less than the preset threshold, wherein the preset threshold is used to suppress interference caused by the wireless communications device to receiving performance of the second wireless communications device under the first condition, wherein
the first condition specifies that the distance between the wireless communications device and a second wireless communications device is less than or equal to a first threshold, and a difference between a working frequency of the wireless communications device and the working frequency of the second wireless communications device is less than or equal to a second threshold.

16. The wireless communications device according to claim 15, wherein the maximum transmit power corresponding to the wireless communications device comprises a maximum configured transmit power $P_{CMAX,c}$ a carrier of the wireless communications device.

17. The wireless communications device according to claim 16, wherein the adjustment module comprises:
a first adjustment unit configured to adjust a maximum configured transmit power $P_{CMAX,c}$ of a target carrier of the wireless communications device according to the following formulas:

$$P_{CMAX\_L,c} \le P_{CMAX,c} \le P_{CMAX\_H,c};$$

$$P_{CMAX\_L,c} = \text{MIN}\left\{ \begin{array}{l} P_{EMAX,c} - \Delta T_{C,c}, P_{PowerClass} - \\ \text{MAX}\left( \begin{array}{l} MPR_c + A - MPR_c + \Delta T_{IB,c} + \\ \Delta T_{C,c} + \Delta T_{ProSe}, P - MPR_c \end{array} \right) \end{array} \right\};$$

and $$P_{CMAX\_H,c} = \text{MIN}\{P_{EMAX,c}, P_{PowerClass}\},$$

wherein
$P_{EMAX,c}$ is a power value delivered at a radio resource control RRC layer for the target carrier $P_{EMAX,c}$ is equal to the preset threshold, $\Delta T_{C,c}$ is a first power loss value, $P_{PowerClass}$ is a power class of the wireless communications device, $MPR_c$ is a first power reduction value, A-$MPR_c$ is a second power loss value, $\Delta T_{IB,c}$ is a second power loss value, $\Delta T_{ProSe}$ is a third power loss value, and P-$MPR_c$ is a third power reduction value.

18. The wireless communications device according to claim 16, wherein the adjustment module comprises:
a second adjustment unit configured to adjust a maximum configured transmit power $P_{CMAX,c}$ of a target carrier of the wireless communications device according to the following formulas:

$$P_{CMAX\_L,c} \le P_{CMAX,c} \le P_{CMAX\_H,c};$$

$$P_{CMAX\_L,c} = \text{MIN}\left\{ \begin{array}{l} P_{EMAX,c} - \Delta T_{C,c}, P_{PowerClass} - \\ \text{MAX}\left( \begin{array}{l} MPR_c + A - MPR_c + \Delta T_{IB,c} + \\ \Delta T_{C,c} + \Delta T_{ProSe}, P - MPR_c \end{array} \right), \\ P_{Regulatory,c} \end{array} \right\};$$

and $$P_{CMAX\_H,c} = \text{MIN}\{P_{EMAX,c}, P_{PowerClass}, P_{Regulatory,c}\},$$

wherein $P_{EMAX,c}$ is a power value delivered at a radio resource control RRC layer for the target carrier, $\Delta T_{C,c}$ is a first power loss value, $P_{PowerClass}$ is a power class of the wireless communications device, $MPR_c$ is a first power reduction value, $A\text{-}MPR_c$ is a second power reduction value, $\Delta T_{IB,c}$ is a second power loss value, $\Delta T_{ProSe}$ is a third power loss value, $P\text{-}MPR_c$ is a third power reduction value, and $P_{Regulatory,c}$ is equal to the preset threshold.

19. The wireless communications device according to claim 18, wherein $$P_{Regulatory,c} = P_{PowerClass} - PCR_c,$$

wherein $PCR_c$ is a preset power reduction value of the carrier.

20. The wireless communications device according to claim 18, wherein $$P_{Regulatory,c} = EIRP\_P_{Regulatory,c} - G_{Ant},$$

wherein $EIRP\_P_{Regulatory,c}$ is a preset equivalent isotropically radiated power value of the carrier, and $G_{Ant}$ an antenna gain of the wireless communications device.

* * * * *